US008030430B2

(12) United States Patent
Fan et al.

(10) Patent No.: US 8,030,430 B2
(45) Date of Patent: *Oct. 4, 2011

(54) STAIN RESISTANT POLYURETHANE COATINGS

(75) Inventors: Wayne W. Fan, Cottage Grove, MN (US); Nathaniel P. Langford, Somerset, WI (US); Richard M. Fischer, Jr., Hudson, WI (US); Amy S. Barnes, St. Paul, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 1345 days.

This patent is subject to a terminal disclaimer.

(21) Appl. No.: 10/957,355

(22) Filed: Oct. 1, 2004

(65) Prior Publication Data

US 2005/0075471 A1 Apr. 7, 2005

Related U.S. Application Data

(60) Provisional application No. 60/509,322, filed on Oct. 6, 2003.

(51) Int. Cl.
*C08L 75/04* (2006.01)
*C08L 75/12* (2006.01)
*C09D 175/04* (2006.01)
*C09D 175/12* (2006.01)
*C08G 18/38* (2006.01)

(52) U.S. Cl. .... 528/27; 427/387; 428/423.1; 428/425.1; 428/425.5; 428/425.6; 524/588; 524/590; 524/591; 524/838; 525/100; 525/101; 525/102; 525/455; 525/474; 528/28; 528/30; 528/49; 528/70; 528/73; 556/414

(58) Field of Classification Search ............... 528/30, 528/49, 70, 27, 28, 73; 556/414; 427/387; 428/423.1, 425.1, 425.5, 425.6; 524/588, 524/590, 591, 838; 525/100, 101, 102, 455, 525/474

See application file for complete search history.

(56) References Cited

U.S. PATENT DOCUMENTS

| 2,803,656 | A | | 8/1957 | Ahlbrecht et al. | |
|---|---|---|---|---|---|
| 3,965,096 | A | * | 6/1976 | Reinisch et al. | 560/251 |
| 4,508,916 | A | | 4/1985 | Newell et al. | |
| 5,532,304 | A | * | 7/1996 | Miyazaki et al. | 524/261 |
| 5,554,709 | A | | 9/1996 | Emmerling et al. | |
| 5,569,696 | A | | 10/1996 | Abramson et al. | |
| 6,121,354 | A | | 9/2000 | Chronister | |
| 6,261,676 | B1 | | 7/2001 | Olson et al. | |
| 6,646,088 | B2 | * | 11/2003 | Fan et al. | 528/30 |
| 2002/0068777 | A1 | * | 6/2002 | Lu et al. | 524/87 |
| 2002/0086743 | A1 | | 7/2002 | Bulpett et al. | |
| 2003/0105220 | A1 | * | 6/2003 | Gupta et al. | 524/589 |

FOREIGN PATENT DOCUMENTS

| EP | 0 498 442 A1 | 8/1992 |
|---|---|---|
| JP | 7-216047 | 8/1995 |
| WO | WO 02/14443 A2 | 2/2002 |
| WO | WO 03/040209 A1 | 5/2003 |

* cited by examiner

*Primary Examiner* — Rabon Sergent
(74) *Attorney, Agent, or Firm* — Kathleen B. Gross; James D. Withers; Lisa P. Fulton

(57) ABSTRACT

A chemical composition comprises one or more urethane oligomers of at least two polymerized units selected from the group consisting of fluorine-containing urethane oligomers and long-chain hydrocarbon-containing urethane oligomers, wherein said oligomers comprise the reaction product of (a) one or more polyfunctional isocyanate compounds, (b) one or more polyols, (c) one or more monoalcohols selected from the group consisting of fluorocarbon monoalcohols, optionally substituted long-chain hydrocarbon monoalcohols, and mixtures thereof, (d) one or more silanes, and (e) one or more stabilizers comprising one or more reactive groups.

29 Claims, No Drawings

STAIN RESISTANT POLYURETHANE COATINGS

STATEMENT OF PRIORITY

This application claims the priority of U.S. Provisional Application No. 60/509,322, filed Oct. 6, 2003, the contents of which are hereby incorporated by reference.

FIELD

This invention relates to stabilized urethane-based stain-release compositions, to coatings comprising the compositions, and to methods for imparting stain-release characteristics.

BACKGROUND

In the past, various fluorochemical compositions have been used to impart oil- and water-repellency and stain resistance to hard surfaces (for example, ceramics, concrete, stone, masonry, and wood). In particular, fluorine-containing urethanes have been found to be well suited for hard surface applications because they can impart long-term durability, uniform oil- and water-repellency, and stain resistance. The weatherability of fluorine-containing urethane coating compositions is a concern, however, particularly in outdoor hard surface applications. Sunlight induced photodegradation can shorten the performance lifetime of the compositions to, for example, only a few months.

SUMMARY

In view of the foregoing, we recognize that there is a need for compositions that can impart long-term oil- and water-repellency and stain resistance to hard surfaces.

Briefly, in one aspect, the present invention provides a chemical composition comprising one or more urethane oligomers of at least two polymerized units. The oligomers comprise the reaction product of:

(a) one or more polyfunctional isocyanate compounds;
(b) one or more polyols;
(c) one or more monoalcohols selected from the group consisting of fluorocarbon monoalcohols, optionally substituted long-chain hydrocarbon monoalcohols, and mixtures thereof;
(d) one or more silanes of the following formula:

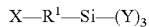

$$X-R^1-Si-(Y)_3$$

wherein

X is $-NH_2$; $-SH$; $-OH$; or $-NRH$, where R is selected from the group consisting of phenyl, straight and branched aliphatic, alicyclic, and aliphatic ester groups;

$R^1$ is an alkylene, heteroalkylene, aralkylene, or heteroaralkylene group; and each Y is independently a hydroxyl; a hydrolyzable moiety selected from the group consisting of alkoxy, acyloxy, heteroalkoxy, heteroacyloxy, halo, and oxime; or a non-hydrolyzable moiety selected from the group consisting of phenyl, alicyclic, straight-chain aliphatic, and branched-chain aliphatic, wherein at least one Y is a hydrolyzable moiety; and (e) one or more stabilizers selected from the group consisting of ultraviolet (UV) absorbers comprising one or more isocyanate-reactive groups and hindered amine light stabilizers (HALS) comprising one or more isocyanate-reactive groups.

In another aspect, the present invention provides chemical compositions comprising an oligomer comprising (a) at least two polymerized units, each said polymerized unit comprising a urethane group, and said oligomer being substituted with (i) one or more covalently bonded perfluoroalkyl groups, or one or more covalently bonded perfluoroheteroalkyl groups, and (ii) one or more covalently bonded silyl groups; and (b) at least one stabilizer, said stabilizer being selected from the group consisting of UV absorbers and HALS, and being covalently bonded to said oligomer.

It has been discovered that UV absorbers and HALS comprising one or more isocyanate-reactive groups can be covalently incorporated into fluorochemical polyurethanes to improve their resistance to photodegradation. Surprisingly, these stabilizers do not interfere with the fluorochemical polyurethane's other desirable characteristics. The chemical compositions of the present invention therefore not only impart stain-release characteristics and exhibit durability, but they also provide increased resistance to photodegradation and environmental weathering. Thus, the chemical compositions of the invention fill the need in the art for compositions that can impart long-term oil- and water-repellency and stain resistance to hard surfaces.

In other aspects, this invention also provides coating compositions comprising the chemical compositions of the invention; articles coated with the coating compositions; and methods for imparting stain-release characteristics to a substrate surface.

Definitions

Unless otherwise stated, the following terms used in the specification and claims have the following meanings:

"Acyloxy" means a radical —OC(O)R where R is, alkyl, alkenyl, and cycloalkyl, for example, acetoxy, 3,3,3-trifluoroacetoxy, propionyloxy, and the like.

"Alkoxy" means a radical —OR where R is an alkyl group as defined below, for example, methoxy, ethoxy, propoxy, butoxy, and the like.

"Alkyl" means a linear saturated monovalent hydrocarbon radical having from one to about twelve carbon atoms or a branched saturated monovalent hydrocarbon radical having from three to about twelve carbon atoms, for example, methyl, ethyl, 1-propyl, 2-propyl, pentyl, and the like.

"Alkylene" means a linear saturated divalent hydrocarbon radical having from one to about twelve carbon atoms or a branched saturated divalent hydrocarbon radical having from three to about twelve carbon atoms, for example, methylene, ethylene, propylene, 2-methylpropylene, pentylene, hexylene, and the like.

"Aralkylene" means an alkylene radical defined above with an aromatic group attached to the alkylene radical, for example, benzyl, pyridylmethyl, 1-naphthylethyl, and the like.

"Fibrous substrate" means a material comprised of synthetic fibers such as wovens, knits, nonwovens, carpets, and other textiles; and a material comprised of natural fibers such as cotton, paper, and leather.

"Fluorocarbon monoalcohol" means a compound having one hydroxyl group and a perfluoroalkyl or a perfluoroheteroalkyl group, for example, $C_4F_9SO_2N(CH_3)CH_2CH_2OH$, $C_4F_9CH_2CH_2OH$, $C_2F_5O(C_2F_4O)_3CF_2CONHC_2H_4OH$, $c-C_6F_{11}CH_2OH$, and the like.

"Halo" means fluoro, chloro, bromo, or iodo, preferably fluoro and chloro.

"Hard substrate" means any rigid material that maintains its shape, for example, glass, ceramic, concrete, natural stone, wood, metals, plastics, and the like.

"Heteroacyloxy" has essentially the meaning given above for acyloxy except that one or more heteroatoms (for example, oxygen, sulfur, and/or nitrogen) can be present in the R group and the total number of carbon atoms present can be up to 50, for example, $CH_3CH_2OCH_2CH_2C(O)O—$, $C_4H_9OCH_2CH_2OCH_2CH_2C(O)O—$, $CH_3O(CH_2CH_2O)_nCH_2CH_2C(O)O—$, and the like.

"Heteroalkoxy" has essentially the meaning given above for alkoxy except that one or more heteroatoms (for example, oxygen, sulfur, and/or nitrogen) can be present in the alkyl chain and the total number of carbon atoms present can be up to 50, for example, $CH_3CH_2OCH_2CH_2O—$, $C_4H_9OCH_2CH_2OCH_2CH_2O—$, $CH_3O(CH_2CH_2O)_nH$, and the like.

"Heteroalkyl" has essentially the meaning given above for alkyl except that one or more heteroatoms (for example, oxygen, sulfur, and/or nitrogen) can be present in the alkyl chain, these heteroatoms being separated from each other by at least one carbon, for example, $CH_3CH_2OCH_2CH_2—$, $CH_3CH_2OCH_2CH_2OCH(CH_3)CH_2—$, $C_4F_9CH_2CH_2SCH_2CH_2—$, and the like.

"Heteroalkylene" has essentially the meaning given above for alkylene except that one or more heteroatoms (for example, oxygen, sulfur, and/or nitrogen) can be present in the alkylene chain, these heteroatoms being separated from each other by at least one carbon, for example, $—CH_2OCH_2O—$, $—CH_2CH_2OCH_2CH_2—$, $—CH_2CH_2N(CH_3)CH_2CH_2—$, $—CH_2CH_2SCH_2CH_2—$, and the like.

"Heteroaralkylene" means an aralkylene radical defined above except that catenated oxygen, sulfur, and/or nitrogen atoms can be present, for example, phenyleneoxymethyl, phenyleneoxyethyl, benzyleneoxymethyl, and the like.

"Long-chain hydrocarbon monoalcohol" means a compound having one hydroxyl group and a long chain hydrocarbon group having 10 to 18 carbons which can be saturated, unsaturated, or aromatic, and can optionally be substituted with one or more chlorine, bromine, trifluoromethyl, or phenyl groups, for example, $CH_3(CH_2)_{10}CH_2OH$, $CH_3(CH_2)_{14}CH_2OH$, and the like.

"Oligomer" means a polymer molecule consisting of only a few (for example, from 2 to about 20) repeat (polymerized) units.

"Perfluoroalkyl" has essentially the meaning given above for "alkyl" except that all or essentially all of the hydrogen atoms of the alkyl radical are replaced by fluorine atoms and the number of carbon atoms is preferably from 2 to about 6, for example, perfluoropropyl, perfluorobutyl, perfluorohexyl, and the like.

"Perfluoroalkylene" has essentially the meaning given above for "alkylene" except that all or essentially all of the hydrogen atoms of the alkylene radical are replaced by fluorine atoms, for example, perfluoropropylene, perfluorobutylene, perfluorooctylene, and the like.

"Perfluoroheteroalkyl" has essentially the meaning given above for "heteroalkyl" except that all or essentially all of the hydrogen atoms of the heteroalkyl radical are replaced by fluorine atoms and the number of carbon atoms is from 3 to about 100, for example, $CF_3CF_2OCF_2CF_2—$, $CF_3CF_2O(CF_2CF_2O)_3CF_2CF_2—$, $C_3F_7O(CF(CF_3)CF_2O)_mCF(CF_3)CF_2—$ where m is from about 10 to about 30, and the like.

"Perfluoroheteroalkylene" has essentially the meaning given above for "heteroalkylene" except that all or essentially all of the hydrogen atoms of the heteroalkylene radical are replaced by fluorine atoms, and the number of carbon atoms is from 3 to about 100, for example, $—CF_2OCF_2—$, $—CF_2O(CF_2O)_n(CF_2CF_2O)_mCF_2—$, and the like.

"Perfluorinated group" means an organic group wherein all or essentially all of the carbon bonded hydrogen atoms are replaced with fluorine atoms, for example, perfluoroalkyl, perfluoroheteroalkyl, and the like.

"Polyfunctional isocyanate compound" means a compound containing two or more isocyanate radicals, —NCO, attached to a multi-valent organic group, for example, hexamethylene diisocyanate, the biuret and iscyanurate of hexamethylene diisocyanate, and the like.

"Polyol" means an organic compound or polymer with an average of at least about 2 primary or secondary hydroxyl groups per molecule, for example, ethylene glycol, propylene glycol, 1,6-hexanediol, and the like.

"Polyalkylsiloxane diol" means a molecule having two hydroxyl groups and a repeating unit with the structure, $—(Si(R)_2O)—$, for example, $HOR[Si(CH_3)_2O]_nSiROH$, wherein each R is independently straight- or branched-chain alkyl.

"Polyarylsiloxane diol" means a molecule having two hydroxyl groups and a repeating unit with the structure, $—(Si(Ar)_2O)—$, for example, $HOR[Si(C_6H_5)_2O]SiROH$, wherein each R is independently straight- or branched-chain alkyl.

"Repellency" is a measure of a treated substrate's resistance to wetting by oil and/or water and/or adhesion of particulate soil. Repellency can be measured by the test methods described herein.

"Resistance," in the context of soiling or staining, is a measure of the treated substrate's ability to avoid staining and/or soiling when contacted by stain or soil respectively.

"Release" is a measure of the treated substrate's ability to have soil and/or stain removed by cleaning or laundering.

"Silane group" means a group comprising silicon to which at least one hydrolyzable group is bonded, for example, $—Si(OCH_3)_3$, $—Si(OOCCH_3)_2CH_3$, $—Si(Cl)_3$, and the like.

DETAILED DESCRIPTION

The chemical compositions of the present invention comprise one or more stabilized urethane oligomers having at least two polymerized units. The polymerized units are selected from the group consisting of fluorine-containing urethane oligomers and long-chain hydrocarbon-containing urethane oligomers. This oligomer comprises the reaction product of (a) one or more polyfunctional isocyanate compounds, (b) one or more polyols, (c) one or more monoalcohols selected from the group consisting of fluorochemical monoalcohols, optionally substituted long-chain hydrocarbon monoalcohols, and mixtures thereof, (d) one or more silanes, and (e) one or more stabilizers selected from the group consisting of UV absorbers comprising one or more isocyanate-reactive groups and HALS comprising one or more isocyanate-reactive groups. Preferably, the oligomer further comprises the reaction product of (f) one or more water-solubilizing compounds comprising one or more water-solubilizing groups and at least one isocyanate-reactive hydrogen containing group.

The silanes are of the following formula:

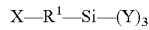

wherein:

X is $—NH_2$; $—SH$; $—OH$; or $—NRH$, where R is a phenyl, straight or branched aliphatic, alicyclic, or aliphatic ester group;

$R^1$ is an alkylene, heteroalkylene, aralkylene, or heteroaralkylene group; and each Y is independently a hydroxyl; a hydrolyzable moiety selected from the group consisting of alkoxy, acyloxy, heteroalkyoxy, heteroacyloxy, halo, and oxime; or a non-hydrolyzable moiety selected from the group consisting of phenyl, alicyclic, straight-chain aliphatic, and branched-chain aliphatic, wherein at least one Y is a hydrolyzable moiety.

The oligomer comprises at least two polymerized units. Each polymerized unit comprises a urethane group that is derived or derivable from the reaction of at least one polyfunctional isocyanate compound and at least one polyol. The oligomer comprises one or more of the following covalently bonded to the polymerized units of the oligomer:

(i) one or more perfluoroalkyl groups, one or more perfluoroheteroalkyl groups, or one or more long-chain alkyl or heteroalkyl groups; (ii) one or more silyl groups; and (iii) one or more stabilizer moieties. These groups can be pendant from the backbone or the polymerized unit or terminal.

The oligomer can further comprise one or more covalently bonded water-solubilizing groups, these solubilizing groups independently being pendant from the polymerized unit or terminal.

In one preferred embodiment, the chemical composition of the present invention comprises a mixture of urethane molecules arising from the reaction of (a) one or more polyfunctional isocyanate compounds, (b) one or more polyols, (c) one or more fluorochemical monoalcohols, (d) one or more silanes as described above, and (e) one or more stabilizers comprising one or more isocyanate-reactive groups.

In another preferred embodiment, the chemical composition of the present invention comprises a mixture of urethane molecules arising from the reaction of (a) one or more polyfunctional isocyanate compounds, (b) one or more polyols, (c) one or more fluorochemical monoalcohols, (d) one or more silanes as described above, (e) one or more stabilizers selected from the group consisting of UV absorbers comprising one or more isocyanate-reactive groups and HALS comprising one or more isocyanate-reactive groups, and (f) one or more water-solubilizing compounds comprising one or more water-solubilizing groups and at least one isocyanate-reactive hydrogen containing group.

The water-solubilizing compounds of the present invention can be represented in general by "W—$R^1$—X," wherein W is one or more water-solubilizing groups, X is an isocyanate-reactive group such as —$NH_2$; —SH; —OH; or —NRH, where R is a phenyl, straight or branched aliphatic, alicyclic, or aliphatic ester group; and $R^1$ is an alkylene, heteroalkylene, aralkylene, or heteroaralkylene group.

In a further preferred embodiment, the chemical composition of the present invention comprises a mixture of urethane molecules arising from the reaction of (a) one or more polyfunctional isocyanate compounds, (b) one or more polyols, (c) one or more optionally substituted long-chain hydrocarbon monoalcohols, (d) one or more silanes as described above, (e) one or more stabilizers comprising one or more isocyanate-reactive groups, and (f) one or more water-solubilizing compounds comprising one or more water-solubilizing groups and at least one isocyanate-reactive group.

The composition can further contain fluorine-containing and or long-chain hydrocarbon-containing urethane compounds having fewer than two polymerized units. The mixture of urethane molecules preferably comprises urethane molecules having a varying number of polymerized units, including one, two, and more polymerized units. This mixture of urethane molecules comprising a varying number of polymerized units allows simple blending of the above components in preparing the fluorochemical composition.

Preferred classes of urethane oligomers that can be present are represented by the following general formulas:

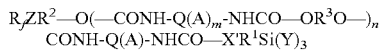

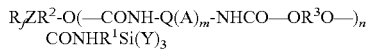

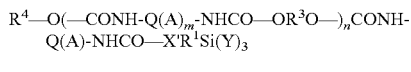

$R^4$—O(—CONH-Q(A)$_m$-NHCO—$OR^3$O—)$_n$
CONHR$^1$Si(Y)$_3$ wherein:

$R_f Z R^2$— is a residue of at least one of the fluorochemical monoalcohols;

$R_f$ is a perfluoroalkyl group having 3 to about 8 carbon atoms, or a perfluoroheteroalkyl group having 3 to about 50 carbon atoms;

Z is a covalent bond, sulfonamido (—$SO_2$NR—), or carboxamido (—CONR—) where R is hydrogen or alkyl;

$R^1$ is an alkylene, heteroalkylene, aralkylene, or heteroaralkylene group;

$R^2$ is a divalent straight- or branched-chain alkylene, cycloalkylene, or heteroalkylene group of 1 to 14 carbon atoms (preferably, 1 to 8 carbon atoms; more preferably, 1 to 4 carbon atoms; most preferably, two carbon atoms; and preferably, $R^2$ is alkylene or heteroalkylene of 1 to 14 carbon atoms);

Q is a multi-valent organic group which is a residue of the polyfunctional isocyanate compound;

$R^3$ is a divalent organic group which is a residue of the polyol and can be optionally substituted with or contain (i) water-solubilizing groups, (ii) perfluorinated groups or (III) silane groups;

X' is —O—, —S—, or —N(R)—, wherein R is hydrogen or alkyl;

$R^4$ is an optionally substituted long-chain hydrocarbon derived from the long-chain hydrocarbon monoalcohol;

each Y is independently a hydroxy; a hydrolyzable moiety selected from the group consisting of alkoxy, acyloxy, heteroalkoxy, heteroacyloxy, halo, and oxime; or a non-hydrolyzable moiety selected from the group consisting of phenyl, alicyclic, straight-chain aliphatic, and branched-chain aliphatic, wherein at least one Y is a hydrolyzable moiety;

A is a pendent group derived from a stabilizer or a water solubilizing group, provided that at least one A is a stabilizer;

m is an integer from 0 to 2; and n, which is the number of polymerized units, is an integer from 2 to 10.

Polyfunctional isocyanate groups that are useful in the present invention comprise isocyanate radicals attached to the multi-valent organic group, Q, which can comprise a multi-valent aliphatic, alicyclic, or aromatic moiety; or a multi-valent aliphatic, alicyclic or aromatic moiety attached to a biuret, an isocyanurate, or a uretdione, or mixtures thereof. Preferred polyfunctional isocyanate compounds contain two or three —NCO radicals. Compounds containing two —NCO radicals are comprised of divalent aliphatic, alicyclic, aralphatic, or aromatic moieties to which the —NCO radicals are attached. Preferred compounds containing three —NCO radicals are comprised of isocyanatoaliphatic, isocyanatoalicyclic, or isocyanatoaromatic, monovalent moieties, which are attached to a biuret or an isocyanurate.

Representative examples of suitable polyfunctional isocyanate compounds include isocyanate functional derivatives of the polyfunctional isocyanate compounds as defined herein.

Examples of derivatives include, for example, those selected from the group consisting of ureas, biurets, allophanates, dimers and trimers (such as uretdiones and isocyanurates) of isocyanate compounds, and mixtures thereof. Any suitable organic polyisocyanate, such as an aliphatic, alicyclic, araliphatic, or aromatic polyisocyanate, can be used either singly or in mixtures of two or more.

The aliphatic polyfunctional isocyanate compounds generally provide better light stability than the aromatic compounds. Aromatic polyfunctional isocyanate compounds, on the other hand, are generally more economical and reactive toward polyols and other poly(active hydrogen) compounds than are aliphatic polyfunctional isocyanate compounds. Suitable aromatic polyfunctional isocyanate compounds include, for example, those selected from the group consisting of 2,4-toluene diisocyanate (TDI), 2,6-toluene diisocyanate, an adduct of TDI with trimethylolpropane (available as DESMODUR™ CB from Bayer Corporation, Pittsburgh, Pa.), the isocyanurate trimer of TDI (available as DESMODUR™ IL from Bayer Corporation, Pittsburgh, Pa.), diphenylmethane 4,4'-diisocyanate (MDI), diphenylmethane 2,4'-diisocyanate, 1,5-diisocyanato-naphthalene, 1,4-phenylene diisocyanate, 1,3-phenylene diisocyanate, 1-methoxy-2,4-phenylene diisocyanate, 1-chlorophenyl-2,4-diisocyanate, and mixtures thereof.

Examples of useful alicyclic polyfunctional isocyanate compounds include, for example, those selected from the group consisting of dicyclohexylmethane diisocyanate ($H_{12}$MDI, commercially available as DESMODUR™ W, available from Bayer Corporation, Pittsburgh, Pa.), 4,4'-isopropyl-bis(cyclohexylisocyanate), isophorone diisocyanate (IPDI), cyclobutane-1,3-diisocyanate, cyclohexane 1,3-diisocyanate, cyclohexane 1,4-diisocyanate (CHDI), 1,4-cyclohexanebis(methylene isocyanate) (BDI), 1,3-bis(isocyanatomethyl)cyclohexane ($H_6$XDI), 3-isocyanatomethyl-3,5,5-trimethylcyclohexyl isocyanate, and mixtures thereof.

Examples of useful aliphatic polyfunctional isocyanate compounds include for example, those selected from the group consisting of 1,4-tetramethylene diisocyanate, hexamethylene 1,4-diisocyanate, hexamethylene 1,6-diisocyanate (HDI), 1,12-dodecane diisocyanate, 2,2,4-trimethyl-hexamethylene diisocyanate (TMDI), 2,4,4-trimethyl-hexamethylene diisocyanate (TMDI), 2-methyl-1,5-pentamethylene diisocyanate, dimer diisocyanate, the urea of hexamethylene diisocyanate, the biuret of hexamethylene 1,6-diisocyanate (HDI) (available as DESMODUR™ N-100 and N-3200 from Bayer Corporation, Pittsburgh, Pa.), the isocyanurate of HDI (available as DESMODUR™ N-3300 and DESMODUR™ N-3600 from Bayer Corporation, Pittsburgh, Pa.), a blend of the isocyanurate of HDI and the uretdione of HDI (available as DESMODUR™ N-3400 available from Bayer Corporation, Pittsburgh, Pa.), and mixtures thereof.

Examples of useful araliphatic polyisocyanates include, for example, those selected from the group consisting of m-tetramethyl xylylene diisocyanate (m-TMXDI), p-tetramethyl xylylene diisocyanate (p-TMXDI), 1,4-xylylene diisocyanate (XDI), 1,3-xylylene diisocyanate, p-(1-isocyanatoethyl)-phenyl isocyanate, m-(3-isocyanatobutyl)-phenyl isocyanate, 4-(2-isocyanatocyclohexyl-methyl)-phenyl isocyanate, and mixtures thereof.

Preferred polyisocyanates, in general, include those selected from the group consisting of hexamethylene 1,6-diisocyanate (HDI), 1,12-dodecane diisocyanate isophorone diisocyanate, toluene diisocyanate, dicyclohexylmethane 4,4'-diisocyanate, MDI, derivatives of all the aforementioned, including DESMODUR™ N-100, N-3200, N-3300, N-3400, N-3600, and mixtures thereof.

Suitable commercially available polyfunctional isocyanates are exemplified by DESMODUR™ T N-3200, DESMODUR™ N-3300, DESMODUR™ N-3400, DESMODUR™ N-3600, DESMODUR™ H (HDI), DESMODUR™ W (bis [4-isocyanatocyclohexyl]methane), MONDUR™ M (4,4'-diisocyanatodiphenylmethane), MONDUR™ TDS (98% toluene 2,4-diisocyanate), MONDUR™ TD-80 (a mixture of 80% 2,4 and 20% 2,6-toluene diisocyanate isomers), and DESMODUR™ N-100, each available from Bayer Corporation, Pittsburgh, Pa.

Other useful triisocyanates are those obtained by reacting three moles of a diisocyanate with one mole of a triol. For example, toluene diisocyanate, 3-isocyanatomethyl-3,4,4-trimethylcyclohexyl isocyanate, or m-tetramethylxylene diisocyanate can be reacted with 1,1,1-tris(hydroxymethyl) propane to form triisocyanates. The product from the reaction with m-tetramethylxylene diisocyanate is commercially available as CYTHANE™ 3160 (American Cyanamid, Stamford, Conn.).

Polyols suitable for use in preparing the chemical compositions of the present invention include those organic polyols that have an average hydroxyl functionality of at least about 2 (preferably, about 2 to 5; more preferably, about 2 to 3; most preferably, about 2, as diols are most preferred). The hydroxyl groups can be primary or secondary, with primary hydroxyl groups being preferred for their greater reactivity. Mixtures of diols with polyols that have an average hydroxyl functionality of about 2.5 to 5 (preferably, about 3 to 4; more preferably, about 3) can also be used. It is preferred that such mixtures contain no more than about 20 percent by weight of such higher polyols, more preferably no more than about 10 percent, and most preferably no more than about 5 percent. Preferred mixtures are mixtures of diols and triols.

Suitable polyols include those that comprise at least one aliphatic, heteroaliphatic, alicyclic, heteroalicyclic, aromatic, heteroaromatic, or polymeric moiety. The polyols may be fluorinated polyols, such as perfluroopolyether diols. Preferred polyols are aliphatic or polymeric polyols that contain hydroxyl groups as terminal groups or as groups that are pendant from the backbone chain of the polyol.

The molecular weight (that is, the number average molecular weight) of hydrocarbon polyols can generally vary from about 60 to about 2000, preferably, from about 60 to about 1000, more preferably, from about 60 to about 500, most preferably, from about 60 to about 300. The equivalent weight (that is, the number average equivalent weight) of hydrocarbon polyols generally can be in the range of about 30 to about 1000, preferably, from about 30 to about 500, more preferably, from about 30 to about 250. Polyols of higher equivalent weight can have a tendency to reduce the stain-release properties provided by the chemical compositions of the present invention unless the polyol contains an $R_f$ group or the polyol comprises a perfluoropolyether. If the polyol comprises a perfluoropolyether, it can have a molecular weight as high as approximately 7000 and can still provide adequate stain-release properties.

When the polyols of the present invention are diols, the diols can be substituted with or contain other groups. Thus, a preferred diol is selected from the group consisting of a branched- or straight-chain hydrocarbon diol, a diol containing at least one water solubilizing group, a fluorinated diol comprising a monovalent or divalent perfluorinated group, a diol comprising a silane group, a polyalkylsiloxane diol, a polyarylsiloxane diol, and mixtures thereof. Solubilizing groups include carboxylate, sulfate, sulfonate, phosphate, phosphonate, ammonium, quaternary ammonium, and the like.

Perfluorinated monovalent groups ($R_f$) can be perfluoroalkyl and perfluoroheteroalkyl, and perfluorinated divalent groups can be perfluoroalkylene and perfluoroheteroalkylene. Perfluoroalkyl groups are preferred, with perfluoroalkyl groups having from 2 to 6 carbon atoms being more preferred and perfluoroalkyl groups having 4 carbon atoms being most preferred. Another embodiment comprises perfluoroheteroalkyl groups having 6 to 50 carbon atoms. Perfluorinated divalent groups are preferably perfluoroheteroalkylene groups. Perfluoroheteroalkylene groups are preferably perfluoropolyether groups having from about 3 to about 50 carbon atoms.

When the diol further comprise a silane group, the silane groups of the diol can contain one, two, or three hydrolyzable groups on the silicon atom. Hydrolyzable groups are as defined below. Polyalkylsiloxane diols include, for example, hydroxyalkyl terminated polydimethyl siloxanes, and the like. Polyarylsiloxane diols are essentially the same as the polyalkylsiloxanes with some or all of the methyl groups replaced with phenyl groups, such as hydroxyalkyl terminated polydiphenylsiloxane and hydroxyalkyl terminated dimethyl-diphenylsiloxane copolymer.

Representative examples of suitable non-polymeric polyols include alkylene glycols, polyhydroxyalkanes, and other polyhydroxy compounds. The alkylene glycols include, for example, 1,2-ethanediol; 1,2-propanediol; 3-chloro-1,2-propanediol; 1,3-propanediol; 1,3-butanediol; 1,4-butanediol; 2-methyl-1,3-propanediol; 2,2-dimethyl-1,3-propanediol (neopentylglycol); 2-ethyl-1,3-propanediol; 2,2-diethyl-1,3-propanediol; 1,5-pentanediol; 2-ethyl-1,3-pentanediol; 2,2,4-trimethyl-1,3-pentanediol; 3-methyl-1,5-pentanediol; 1,2-hexanediol; 1,5-hexanediol; 1,6-hexanediol; 2-ethyl-1,6-hexanediol; bis(hydroxymethyl)cyclohexane; 1,8-octanediol; bicyclo-octanediol; 1,10-decanediol; tricyclodecanediol; norbornanediol; and 1,18-dihydroxyoctadecane.

The polyhydroxyalkanes include, for example, glycerine; trimethylolethane; trimethylolpropane; 2-ethyl-2-(hydroxymethyl)-1,3-propanediol; 1,2,6-hexanetriol; pentaerythritol; quinitol; mannitol; and sorbitol.

Other polyhydroxy compounds include, for example, di(ethylene glycol); tri(ethylene glycol); tetra(ethylene glycol); tetramethylene glycol; dipropylene glycol; diisopropylene glycol; tripropylene glycol; bis(hydroxymethyl)propionic acid; N,N-bis(2-hydroxyethyl)-3-aminopropyltriethoxysilane; bicine; N-bis(2-hydroxyethyl) Perfluorobutylsulfonamide; 1,11-(3,6-dioxaundecane)diol; 1,14-(3,6,9,12-tetraoxatetradecane)diol; 1,8-(3,6-dioxa-2,5,8-trimethyloctane)diol; 1,14-(5,10-dioxatetradecane)diol; castor oil; 2-butyne-1,4-diol; N,N-bis(hydroxyethyl)benzamide; 4,4'-bis(hydroxymethyl)diphenylsulfone; 1,4-benzenedimethanol; 1,3-bis(2-hydroxyethyoxy)benzene; 1,2-dihydroxybenzene; resorcinol; 1,4-dihydroxybenzene; 3,5-dihydroxybenzoic acid; 2,6-dihydroxybenzoic acid; 2,5-dihydroxybenzoic acid; 2,4-dihydroxybenzoic acid; 1,6-dihydroxynaphthalene; 2,6-dihydroxynaphthalene; 2,5-dihydroxynaphthalene; 2,7-dihydroxynaphthalene; 2,2'-biphenol; 4,4'-biphenol; 1,8-dihydroxybiphenyl; 2,4-dihydroxy-6-methyl-pyrimidine; 4,6-dihydroxypyrimidine; 3,6-dihydroxypyridazine; bisphenol A; 4,4'-ethylidenebisphenol; 4,4'-isopropylidenebis(2,6-dimethylphenol); bis(4-hydroxyphenyl)methane; 1,1-bis(4-hydroxyphenyl)-1-phenylethane (bisphenol C); 1,4-bis(2-hydroxyethyl)piperazine; bis(4-hydroxyphenyl) ether; as well as other aliphatic, heteroaliphatic, saturated alicyclic, aromatic, saturated heteroalicyclic, and heteroaromatic polyols; and the like, and mixtures thereof.

Representative examples of useful polymeric polyols include polyoxyethylene, polyoxypropylene, and ethylene oxide-terminated polypropylene glycols and triols of molecular weights from about 200 to about 2000, corresponding to equivalent weights of about 100 to about 1000 for the diols or about 70 to about 700 for triols; polytetramethylene glycols of varying molecular weight; polydialkylsiloxane diols of varying molecular weight; hydroxy-terminated polyesters and hydroxy-terminated polylactones (for example, polycaprolactone polyols); hydroxy-terminated polyalkadienes (for example, hydroxyl-terminated polybutadienes); and the like. Mixtures of polymeric polyols can be used if desired.

Useful commercially available polymeric polyols include CARBOWAX™ poly(ethylene glycol) materials in the number average molecular weight ($M_n$) range of from about 200 to about 2000 (available from Union Carbide Corp., Danbury, Conn.); poly(propylene glycol) materials such as PPG-425 (available from Lyondell Chemical Company, Houston, Tex.); block copolymers of poly(ethylene glycol) and poly (propylene glycol) such as PLURONIC™ L31 (available from BASF Corporation, Mount Olive, N.J.); bisphenol A ethoxylate, Bisphenol A propyloxylate, and Bisphenol A propoxylate/ethoxylate (available from Sigma-Aldrich, Milwaukee, Wis.); polytetramethylene ether glycols such as POLY-MEG™ 650 and 1000 (available from Quaker Oats Company, Chicago, Ill.) and the TERATHANE™ polyols (available from E.I. duPont de Nemours, Wilmington, Del.); hydroxyl-terminated polybutadiene resins such as the POLY BD™ materials (available from Elf Atochem, Philadelphia, Pa.); the "PeP" series (available from Wyandotte Chemicals Corporation, Wyandotte, Mich.) of polyoxyalkylene tetrols having secondary hydroxyl groups, for example, "PeP" 450, 550, and 650; polycaprolactone polyols with $M_n$ in the range of about 200 to about 2000 such as TONE™ 0201, 0210, 0301, and 0310 (available from Union Carbide Corp., Danbury, Conn.); "PARAPLEX™ U-148" (available from Rohm and Haas Co., Philadelphia, Pa.), an aliphatic polyester diol; polyester polyols such as the MULTRON™ poly(ethylene-adipate)polyols (available from Mobay Chemical Corp., Irvine, Calif.); polycarbonate diols such as DURACARB™ 120, a hexanediol carbonate with $M_n$=900 (available from PPG Industries, Inc., Pittsburgh, Pa.); and the like; and mixtures thereof.

Useful non-fluorinated polyols include 2,2-bis(hydroxymethyl)propionic acid; N,N-bis(2-hydroxyethyl)-3-aminopropyltriethoxysilane; bicine; 3,5-dihydroxybenzoic acid; 2,4-dihydroxybenzoic acid; 1,2-ethanediol; 1,2- and 1,3-propanediol; 1,3-butanediol; 1,4-butanediol; neopentylglycol; 1,5-pentanediol; 3-methyl-1,5-pentanediol; 1,2-hexandiol; 1,5-hexanediol; 1,6-hexanediol; bis (hydroxymethyl)cyclohexane; 1,8-octanediol; 1,10-decanediol; di(ethylene glycol); tri(ethylene glycol); tetra (ethylene glycol); di(propylene glycol); di(isopropylene glycol); tri(propylene glycol); poly(ethylene glycol) diols (number average molecular weight of about 200 to about 1500); poly(di(ethylene glycol) phthalate) diol (having number average molecular weights of, for example, about 350 or about 575); poly(propylene glycols) diols (number average molecular weight of about 200 to about 500); block copolymers of poly(ethylene glycol) and poly(propylene glycol) such as PLURONIC™ L31 (available from BASF Corporation, Mount Olive, N.J.); polydimethylsiloxane diol; polycaprolactone diols (number average molecular weight of about 200 to about 600); resorcinol; hydroquinone; 1,6-dihydroxynaphthalene; 2,5-dihydroxynaphthalene; 2,6-dihydroxynaphthalene; 2,7-dihydroxynaphthalene; 4,4'-biphenol; bisphenol A; bis(4-hydroxyphenyl)methane; and the like; and mixtures thereof.

More preferred polyols include bis(hydroxymethyl)propionic acid; bicine; N-bis(2-hydroxyethyl)perfluorobutylsulfonamide; 1,2-ethanediol; 1,2-propanediola; 1,3-propanediol; 1,4-butanediol; neopentylglycol; 1,2-hexanediol; 1,6-hexanediol; di(ethylene glycol); tri(ethylene glycol); 1,4-bis(1-hydroxy-1,1-dihydroperfluoropropoxy)perfluoro-n-butane $(HOCH_2CF_2CF_2O(CF_2)_4OCF_2CF_2CH_2OH)$; fluorinated oxetane polyols made by the ring-opening polymerization of fluorinated oxetane such as POLY-3-FOX™ (available from Omnova Solutions, Inc., Akron Ohio); poly(di(ethylene glycol) phthalate) diol (having number average molecular weights of, for example, about 350 or about 575); poly(ethylene glycol) diols (having number average molecular weights of, for example, about 200, 300, 400); polydimethylsiloxane diol; polypropylene glycol (having a number average molecular weight of, for example, about 425); dimer diol; polycaprolactone diol (having a number average molecular weight of, for example, about 530); 3,5-dihydroxybenzene; bisphenol A; resorcinol; hydroquinone; and mixtures thereof. The polyol may further be selected from fluorinated polyols.

Representative examples of suitable fluorinated polyols include $R_fSO_2N(CH_2CH_2OH)_2$ such as N-bis(2-hydroxyethyl)perfluorobutylsulfonamide; $R_fOC_6H_4SO_2N(CH_2CH_2OH)$ 2; $RfSO_2N(R')CH_2CH(OH)CH_2OH$ such as $C_6F_{13}SO_2N(C_3H_7)CH_2CH(OH)CH_2OH$; $R_fCH_2$ $CON(CH_2CH_2OH)_2$; $R_fCON(CH_2CH_2OH)_2$; $CF_3CF_2(OCF_2CF_2)_3$ $OCF_2CON(CH_3)CH_2CH(OH)CH_2OH$; $R_fOCH_2$ $CH(OH)CH_2OH$ such as $C_4F_9OCH_2$ $CH(OH)CH_2OH$; $R_fCH_2CH_2SC_3H_6OCH_2CH(OH)CH_2OH$; $R_fCH_2CH_2SC_3H_6CH(CH_2OH)_2$; $R_fCH_2CH_2SCH_2CH(OH)CH_2OH$; $R_fCH_2CH_2$ $SCH(CH_2OH)CH_2CH_2OH$; $R_fH_2CH_2CH_2SCH_2CH(OH)CH_2OH$ such as $C_5F_{11}(CH_2)_3SCH_2CH(OH)CH_2OH$; $R_fCH_2CH_2$ $CH_2OCH_2CH(OH)CH_2OH$ such as $C_5F_{11}(CH_2)_3OCH_2CH(OH)CH_2OH$; $R_fCH_2CH_2CH_2OC_2H_4OCH_2CH(OH)CH_2OH$; $R_f$ $CH_2CH_2(CH_3)OCH_2CH(OH)CH_2OH$; $R_f(CH_2)_4SC_3H_6CH(CH_2OH)CH_2OH$; $R_f(CH_2)_4SCH_2CH(CH_2OH)_2$; $R_f$ $(CH_2)_4SC_3H_6OCH_2$ $CH(OH)CH_2OH$; $R_fCH_2CH(C_4H_9)SCH_2CH(OH)CH_2OH$; $R_fCH_2$ $OCH_2CH(OH)CH_2OH$; $R_fCH_2CH(OH)CH_2SCH_2CH_2OH$; $R_fCH_2$ $CH(OH)CH_2SCH_2CH_2OH$; $R_fCH_2CH(OH)CH_2OCH_2CH_2OH$; $R_fCH_2CH(OH)CH_2OH$; $R_fR''SCH(R'''OH)CH(R'''OH)SR''R_f$; $(R_fCH_2CH_2SCH_2CH_2SCH_2)_2C(CH_2OH)$ 2; $((CF_3)_2CFO(CF_2)_2$ $(CH_2)_2SCH_2)_2C(CH_2$ $OH)_2$; $(R_fR''SCH_2)_2C(CH_2OH)_2$; 1,4-bis(1-hydroxy-1,1-dihydroperfluoroethoxyethoxy)perfluoro-n-butane $(HOCH_2CF_2OC_2F_4O(CF_2)_4OC_2F_4OCF_2CH_2OH)$; 1,4-bis(1-hydroxy-1,1-dihydroperfluoropropoxy)perfluoro-n-butane $(HOCH_2CF_2CF_2O(CF_2)_4OCF_2CF_2CH_2OH)$; fluorinated oxetane polyols made by the ring-opening polymerization of fluorinated oxetane such as Poly-3-Fox™ (available from Omnova Solutions, Inc., Akron Ohio); polyetheralcohols prepared by ring opening addition polymerization of a fluorinated organic group substituted epoxide with a compound containing at least two hydroxyl groups as described in U.S. Pat. No. 4,508,916 (Newell et al); and perfluoropolyether diols such as Fomblin™ ZDOL $(HOCH_2CF_2O(CF_2O)_{8-12}(CF_2CF_2O)_{8-12}CF_2CH_2OH$, available from Ausimont); wherein $R_f$ is a perfluoroalkyl group having 1 to 12 carbon atoms, or a perfluoroheteroalkyl group having 3 to about 50 carbon atoms with all perfluorocarbon chains present having 6 or fewer carbon atoms, or mixtures thereof; R' is alkyl of 1 to 4 carbon atoms; R" is branched or straight chain alkylene of 1 to 12 carbon atoms, alkylenethioalkylene of 2 to 12 carbon atoms, alkylene-oxyalkylene of 2 to 12 carbon atoms, or alkylene iminoalkylene of 2 to 12 carbon atoms, where the nitrogen atom contains as a third substituent hydrogen or alkyl of 1 to 6 carbon atoms; and R'" is a straight or branched chain alkylene of 1 to 12 carbon atoms or an alkylene-polyoxyalkylene of formula $C_rH_{2r}(OC_sH_{2s})_n$ where r is 1-12, s is 2-6, and t is 1-40.

Preferred fluorinated polyols include N-bis(2-hydroxyethyl) perfluorobutylsulfonamide; fluorinated oxetane polyols made by the ring-opening polymerization of fluorinated oxetane such as Poly-3-Fox<< (available from Omnova Solutions, Inc., Akron Ohio); polyetheralcohols prepared by ring opening addition polymerization of a fluorinated organic group substituted epoxide with a compound containing at least two hydroxyl groups as described in U.S. Pat. No. 4,508,916 (Newell et al); perfluoropolyether diols such as Fomblin ZDOL $(HOCH_2CF_2O(CF_2O)_{8-12}(CF_2CF_2O)_{8-12}CF_2CH_2OH$, available from Ausimont); 1,4-bis(1-hydroxy-1,1-dihydroperfluoroethoxyethoxy)perfluoro-n-butane $(HOCH_2CF_2OC_2F_4O(CF_2)_4OC_2F_4OCF_2CH_2OH)$; and 1,4-bis(1-hydroxy-1,1-dihydroperfluoropropoxy)perfluoro-n-butane $(HOCH_2CF_2CF_2O(CF_2)_4 OCF_2CF_2CH_2OH)$.

More preferred polyols comprised of at least one fluorine-containing group include N-bis(2-hydroxyethyl)perfluorobutylsulfonamide; 1,4-bis(1-hydroxy-1,1-dihydroperfluoropropoxy)perfluoro-n-butane $(HOCH_2CF_2CF_2O(CF_2)_4 OCF_2CF_2CH_2OH)$.

Fluorochemical monoalcohols suitable for use in preparing the chemical compositions of the present invention include those that comprise at least one $R_f$ group. The $R_f$ groups can contain straight-chain, branched-chain, or cyclic fluorinated alkylene groups or any combination thereof. The $R_f$ groups can optionally contain one or more heteroatoms (for example, oxygen, sulfur, and/or nitrogen) in the carbon-carbon chain so as to form a carbon-heteroatom-carbon chain (that is, a heteroalkylene group). Fully-fluorinated groups are generally preferred, but hydrogen or chlorine atoms can also be present as substituents, provided that no more than one atom of either is present for every two carbon atoms. It is additionally preferred that any $R_f$ group contain at least about 40% fluorine by weight, more preferably at least about 50% fluorine by weight. The terminal portion of the group is generally fully-fluorinated, preferably containing at least three fluorine atoms (for example, CF30—, $CF_3CF_2$—, $CF_3CF_2CF_2$—, $(CF_3)_2N$—, $(CF_3)_2CF$—, or $SF_5CF_2$—). Perfluorinated aliphatic groups (that is, those of the formula $C_nF_{2n+1}$—) wherein n is 2 to 6 inclusive are the preferred $R_f$ groups, with n=3 to 5 being more preferred and with n=4 being the most preferred.

Useful fluorine-containing monoalcohols include compounds of the following formula:

$$R_f-Z-R^2-OH$$

wherein:

$R_f$ is a perfluoroalkyl group or a perfluoroheteroalkyl group as defined above;

Z is a connecting group selected from a covalent bond, a sulfonamido group, a carboxamido group, a carboxyl group, or a sulfinyl group; and $R^2$ is a divalent straight- or branched-chain alkylene, cycloalkylene, or heteroalkylene group of 1 to 14 carb, 1 to 4 carbon atoms; most preferably, 2 carbon atoms).

Representative examples of useful fluorine-containing monoalcohols include the following:

$$CF_3(CF_2)_3SO_2N(CH_3)CH_2CH_2OH,$$

$$CF_3(CF_2)_3SO_2N(CH_3)CH(CH_3)CH_2OH,$$

$CF_3(CF_2)_3SO_2N(CH_3)CH_2CH(CH_3)OH$, $CF_3(CF_2)_3SO_2N(CH_2CH_3)CH_2CH_2OH$, $CF_3(CF_2)_3SO_2N(CH_3)CH_2CH_2SCH_2CH_2OH$, $C_6F_{13}SO_2N(CH_3)(CH_2)_4OH$, $CF_3(CF_2)_7SO_2N(H)(CH_2)_3OH$, $C_8F_{17}SO_2N(CH_3)CH_2CH_2OH$, $CF_3(CF_2)_7SO_2N(CH_3)(CH_2)_4OH$, $C_8F_{17}SO_2N(CH_3)(CH_2)_{11}OH$, $CF_3(CF_2)_7SO_2N(CH_2CH_3)CH_2CH_2OH$, $CF_3(CF_2)_7SO_2N(C_2H_5)(CH_2)_6OH$, $CF_3(CF_2)_7SO_2N(C_2H_5)(CH_2)_{11}OH$, $CF_3(CF_2)_6SO_2N(C_3H_7)CH_2OCH_2CH_2CH_2OH$, $CF_3(CF_2)_7SO_2N(CH_2CH_2CH_3)CH_2CH_2OH$, $CF_3(CF_2)_9SO_2N(CH_2CH_2CH_3)CH_2CH_2OH$, $CF_3(CF_2)_7SO_2N(C_4H_9)CH_2CH_2OH$, $CF_3(CF_2)_7SO_2N(C_4H_9)(CH_2)_4OH$, 2-(N-methyl-2-(4-perfluoro-(2,6-diethylmorpholinyl)) perfluoroethylsulfonamido) ethanol, $C_3F_7CONHCH_2CH_2OH$, $C_7F_{15}CON(CH_3)CH_2CH_2OH$, $C_7F_{15}CON(C_2H_5)CH_2-CH_2OH$, $C_8F_{17}CON(C_2H_5)CH_2CH_2OH$, $C_8F_{17}CON(CH_3)(CH_2)_{11}OH$, $C_4F_9CF(CF_3)CON(H)CH_2CH_2OH$ $C_6F_{13}CF(CF_3)CON(H)CH_2CH_2OH$ $C_7F_{15}CF(CF_3)CON(H)CH_2CH_2OH$ $C_2F_5O(C_2F_4O)_3CF_2CONHC_2H_4OH$, $CF_3O(CF(CF_3)CF_2O)_{1-36}CF(CF_3)CH_2OH$, $C_2F_5O(CF(CF_3)CF_2O)_{1-36}CF(CF_3)CH_2OH$, $C_3F_7O(CF(CF_3)CF_2O)_{1-36}CF(CF_3)CH_2OH$, $C_4F_9O(CF(CF_3)CF_2O)_{1-36}CF(CF_3)CH_2OH$, $C_3F_7O(CF(CF_3)CF_2O)_{12}CF(CF_3)CH_2OH$, $CF_3O(CF_2CF_2O)_{1-36}CF_2CH_2OH$, $C_2F_5O(CF_2CF_2O)_{1-36}CF_2CH_2OH$, $C_3F_7O(CF_2CF_2O)_{1-36}CF_2CH_2OH$, $C_4F_9O(CF_2CF_2O)_{1-36}CF_2CH_2OH$, $n\text{-}C_4F_9OC_2F_4OCF_2CH_2OCH_2CH_2OH$ $CF_3O(CF_2CF_2O)_{11}CF_2CH_2OH$, $CF_3CF(CF_2Cl)(CF_2CF_2)_6CF_2CON(CH_3)CH_2CH_2OH$, $CF_3(CF_2)_6SO_2CH_2CH_2OH$, $CF_3(CF_2)_7SO_2CH_2CH_2OH$, $C_5F_{11}COOCH_2CH_2OH$, $CF_3(CF_2)_6COOCH_2CH_2OH$, $C_6F_{13}CF(CF_3)COOCH_2CH(CH_3)OH$ $C_8F_{17}COOCH_2CH_2OH$, $C_8F_{17}(CH_2)_{11}N(C_2H_5)CH_2CH_2OH$, $C_3F_7CH_2OH$, $CF_3(CF_2)_6CH_2OH$, Perfluoro(cyclohexyl)methanol $C_4F_9CH_2CH_2OH$, $CF_3(CF_2)_5CH_2CH_2OH$ $CF_3(CF_2)_6CH_2CH_2CH_2OH$, $CF_3(CF_2)_7CH_2CH_2OH$, $CF_3(CF_2)_7CH_2CH_2SO_2N(CH_3)CH_2CH_2OH$, $CF_3(CF_2)_5CH_2CH_2SO_2N(CH_3)CH_2CH_2OH$, $CF_3(CF_2)_3CH_2CH_2SO_2N(CH_3)CH_2CH_2OH$, $CF_3(CF_2)_7CH_2CH_2CH_2OH$, $CF_3CF(CF_2H)(CF_2)_{10}(CH_2)_2OH$, $CF_3CF(CF_2Cl)(CF_2)_{10}(CH_2)_2OH$, $R_f(CH_2)_2S(CH_2)_2OH$, $C_4F_9(CH_2)_2S(CH_2)_2OH$, $R_f(CH_2)_4S(CH_2)_2OH$, $R_f(CH_2)_2S(CH_2)_3OH$, $R_f(CH_2)_2SCH(CH_3)CH_2OH$, $R_f(CH_2)_4SCH(CH_3)CH_2OH$, $R_fCH_2CH(CH_3)S(CH_2)_2OH$, $R_f(CH_2)_2S(CH_2)_{11}OH$, $R_f(CH_2)_2S(CH_2)_3O(CH_2)_2OH$, $R_f(CH_2)_3O(CH_2)_2OH$, $R_f(CH_2)_3SCH(CH_3)CH_2OH$, and the like, and mixtures thereof, wherein $R_f$ is a perfluoroalkyl group of 2 to 16 carbon atoms. If desired, rather than using such alcohols, similar thiols can be utilized.

Preferred fluorine-containing monoalcohols include 2-(N-methylperfluorobutanesulfonamido)ethanol, 2-(N-ethylperfluorobutanesulfonamido)ethanol, 2-(N-methylperfluorobutanesulfonamido)propanol, N-methyl-N-(4-hydroxybutyl) perfluorohexanesulfonamide, 1,1,2,2-tetrahydroperfluorooctanol, C₄F₉OC₂F₄OCF₂CH₂OCH₂CH₂OH, C₃F₇CON(H)CH₂CH₂OH, C₃F₇O(CF (CF₃)CF₂O)₁₋₃₆CF (CF₃)CH₂OH, CF₃O(CF₂CF₂O)₁₋₃₆CF₂CH₂OH, and the like, and mixtures thereof.

Long-chain hydrocarbon monoalcohols suitable for use in the chemical compositions of the present invention comprise at least one, essentially unbranched, hydrocarbon chain having from 10 to about 18 carbon atoms, which can be saturated, unsaturated, or aromatic. These long-chain hydrocarbon monoalcohols can be optionally substituted, for example, with groups such as one or more chlorine, bromine, trifluoromethyl, or phenyl groups. Representative long-chain hydrocarbon monoalcohols include 1-octanol, 1-decanol, 1-dodecanol, 1-tetradecanol, 1-hexadecanol, 1-octadecanol, and the like, and mixtures thereof. Preferred long-chain hydrocarbon monoalcohols have 12 to 16 carbon atoms, with 12 to 14 carbon atoms being more preferred and 12 carbon atoms being most preferred for water solubility and performance.

Silane compounds suitable for use in the chemical compositions of the present invention are those of the following formula:

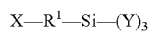

X—R¹—Si—(Y)₃ wherein X, R¹, and Y are as defined previously. Therefore, these silane compounds contain one, two, or three hydrolyzable groups (Y) on the silicon and one organic group including an isocyanate-reactive or an active hydrogen reactive radical (X—R¹). Any of the conventional hydrolyzable groups, such as those selected from the group consisting of alkoxy, acyloxy, heteroalkoxy, heteroacyloxy, halo, oxime, and the like, can be used as the hydrolyzable group (Y). The hydrolyzable group (Y) is preferably alkoxy or acyloxy and more preferably alkoxy.

When Y is halo, the hydrogen halide liberated from the halogen-containing silane can cause polymer degradation when cellulose substrates are used. When Y is an oxime group, lower oxime groups of the formula —N=CR⁵R⁶, wherein R⁵ and R⁶ are monovalent lower alkyl groups comprising about 1 to about 12 carbon atoms, which can be the same or different, preferably selected from the group consisting of methyl, ethyl, propyl, and butyl, are preferred.

Representative divalent bridging radicals (R¹) include, for example, those selected from the group consisting of —CH₂CH₂—, —CH₂CH₂CH₂—, —CH₂CH₂CH₂OCH₂CH₂—, —CH₂CH₂C₆H₄CH₂CH₂—, and —CH₂CH₂O(C₂H₄O)₂CH₂CH₂N(CH₃)CH₂CH₂CH₂—.

Other preferred silane compounds are those which contain one or two hydrolyzable groups, such as those having the structures R²OSi(R⁷)₂R¹XH and (R⁸O)₂Si (R⁷)R¹XH, wherein R¹ is as previously defined, and R⁷ and R⁸ are selected from the group consisting of a phenyl group, an alicyclic group, or a straight or branched aliphatic group having from about 1 to about 12 carbon atoms. Preferably, R⁷ and R⁸ are a lower alkyl group comprising 1 to 4 carbon atoms.

Following the hydrolysis of some of these terminal silyl groups, inter-reaction with a substrate surface comprising —SIOH groups or other metal hydroxide groups to form siloxane or metal-oxane linkages, for example,

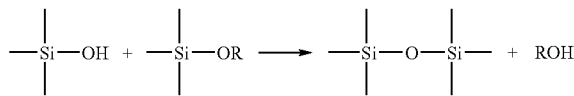

can occur. Bonds thus formed, particularly Si—O—Si bonds, are water resistant and can provide enhanced durability of the stain-release properties imparted by the chemical compositions of the present invention.

Such silane compounds are well known in the art and many are commercially available or are readily prepared. Representative isocyanate-reactive silane compounds include, for example:

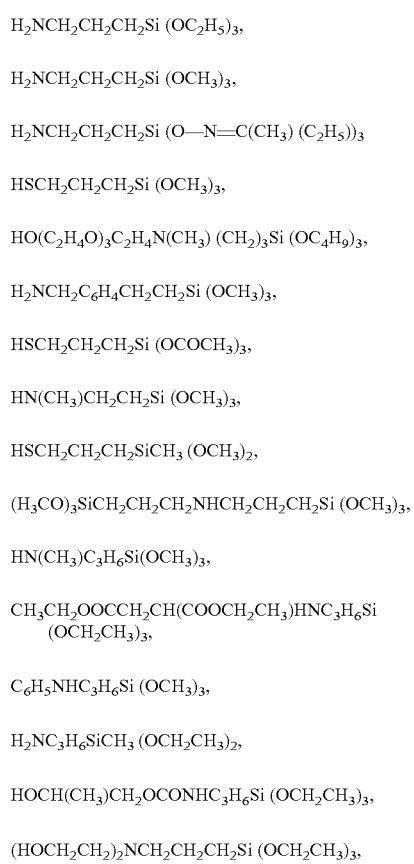

H₂NCH₂CH₂CH₂Si (OC₂H₅)₃,

H₂NCH₂CH₂CH₂Si (OCH₃)₃,

H₂NCH₂CH₂CH₂Si (O—N=C(CH₃) (C₂H₅))₃

HSCH₂CH₂CH₂Si (OCH₃)₃,

HO(C₂H₄O)₃C₂H₄N(CH₃) (CH₂)₃Si (OC₄H₉)₃,

H₂NCH₂C₆H₄CH₂CH₂Si (OCH₃)₃,

HSCH₂CH₂CH₂Si (OCOCH₃)₃,

HN(CH₃)CH₂CH₂Si (OCH₃)₃,

HSCH₂CH₂CH₂SiCH₃ (OCH₃)₂, (H₃CO)₃SiCH₂CH₂CH₂NHCH₂CH₂CH₂Si (OCH₃)₃,

HN(CH₃)C₃H₆Si(OCH₃)₃,

CH₃CH₂OOCCH₂CH(COOCH₂CH₃)HNC₃H₆Si (OCH₂CH₃)₃,

C₆H₅NHC₃H₆Si (OCH₃)₃,

H₂NC₃H₆SiCH₃ (OCH₂CH₃)₂,

HOCH(CH₃)CH₂OCONHC₃H₆Si (OCH₂CH₃)₃, (HOCH₂CH₂)₂NCH₂CH₂CH₂Si (OCH₂CH₃)₃, and mixtures thereof.

Representative examples of hydroxyl-reactive silane compounds include, for example, 3-isocyanatopropyltriethoxysilane, 3-isocyanatopropyltrimethoxysilane, and the like.

Stabilizers that are useful in the chemical compositions of the invention include, for example, ultraviolet (UV) absorbers and hindered amine light stabilizers that comprise isocyanate-reactive groups that enable covalent incorporation into the polyurethane. Such reactable stabilizers can comprise, for example, one or more isocyanate-reactive groups such as amine, hydroxyl or similar groups. Preferably, the reactable stabilizers comprise hydroxyl groups.

UV absorbers that are suitable for use in the present invention protect the composition by absorbing radiation in the range of about 270-500 nanometers and releasing the energy into the environment through non-destructive means. Suitable UV absorbers include, for example, isocyanate-reactable cinnamate esters, hydroxybenzophenones, benzotriazoles, substituted acrylates, salicylates, oxanilides, hydroxyphenyltriazines, and the like.

Representative examples of suitable reactable UV absorbers include 2-amino-5-chlorobenzophenone,

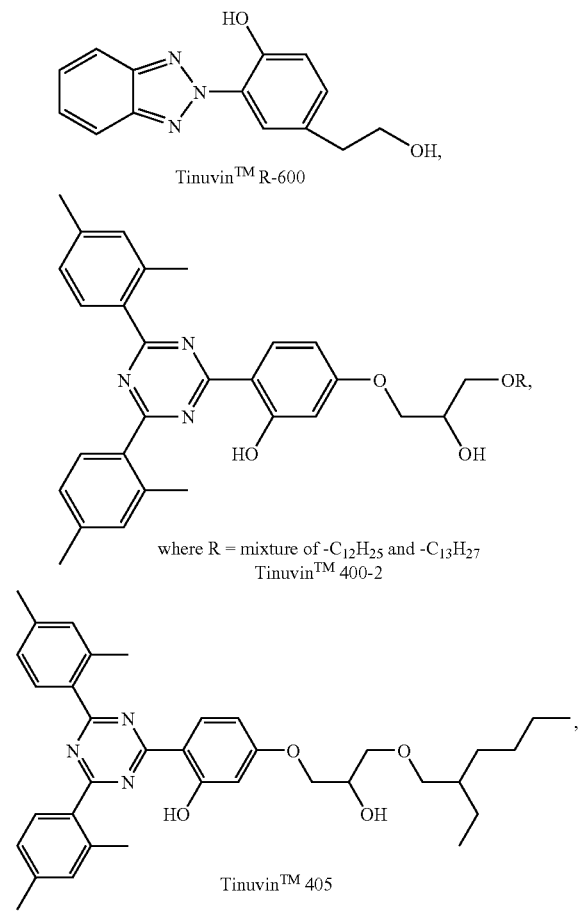

and Tinuvin™ 1130:

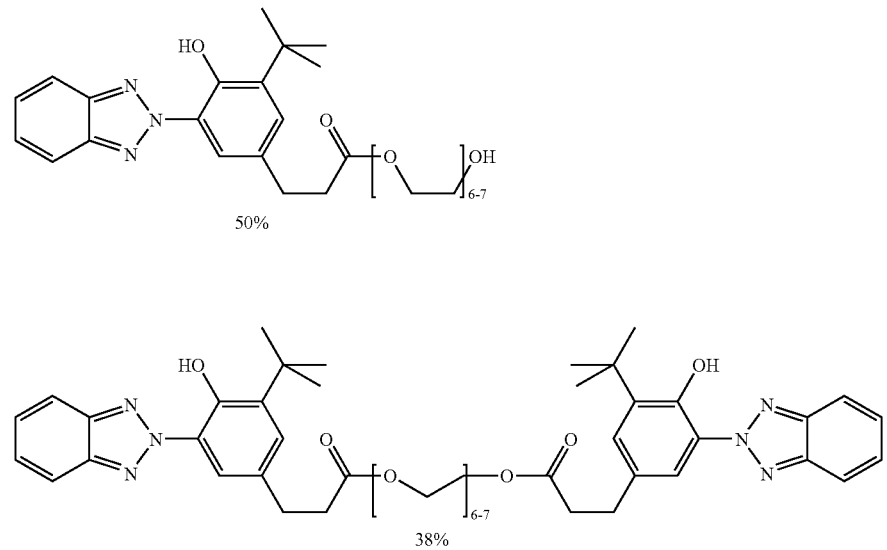

Preferred UV absorbers include, for example, Tinuvin™ 405 and Tinuvin™ 1130.

Hindered amine light stabilizers (HALS) function by inhibiting degradation of the binder in coatings, which has already formed free radicals. An example of a suitable reactable HALS is

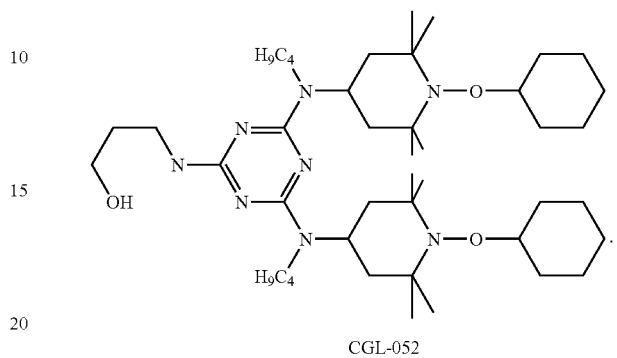

Antioxidants and thermal stabilizers can optionally be included in the compositions of the invention. Antioxidants and thermal stabilizers can help minimize the degradative effects of thermal, photoinduced, and auto-catalytic degradation processes. Suitable antioxidant and/or thermal stabilizers include, for example, sterically hindered phenols, bisphenols, aminophenols, secondary aromatic amines, hydroxybenzyl compounds, alkyl and arylthioethers, thiobisphenols, phosphates and phosphonites, zinc-thiocarbamates, benzofuranone lactone-based antioxidants, nickel quenchers, metal deactivators or complexing agents, and the like.

The chemical compositions of the invention can optionally contain water-solubilizing compounds (W—$R^1$—X) comprising one or more water-solubilizing groups and at least one isocyanate-reactive group. These water-solubilizing compounds include, for example, diols and monoalcohols comprising one or more water-solubilizing groups, added in addition to the one or more polyols and one or more monoalcohols as described above.

The solubilizing groups of the water-solubilizing compounds include, for example, carboxylate, sulfate, sulfonate, phosphate, phosphonate, ammonium, and quaternary ammonium groups. Such groups can be represented as —$CO_2M$, —$OSO_3M$, —$SO_3M$, —$OPO_3M$, —$PO(OM)_2$, —$NR_2HX$, —$NR_3X$, —$NRH_2X$, and —$NH_3X$, respectively, wherein M is H or one equivalent of a monovalent or divalent soluble cation such as sodium, potassium, calcium, and $NR_3H^+$; X is a soluble anion such as those selected from the group consisting of halide, hydroxide, carboxylate, sulfonates, and the like; and R is selected from the group consisting of a phenyl group, a cycloaliphatic group, or a straight or branched aliphatic group having from about 1 to about 12 carbon atoms. Preferably, R is a lower alkyl group having from 1 to 4 carbon atoms. The group —$NR_3X$ is a salt of a water-soluble acid, for example trimethyl ammonium chloride, pyridinium sulfate, etc. or an ammonium substituent. The group —$NR_2HX$ is the salt of a water-soluble acid, such as dimethyl ammonium acetate or propionate. The group —$NRH_2X$ is the salt of a water-soluble acid, such as methyl ammonium acetate or propionate. The group —$NH_3X$ is the salt of a water-soluble acid, such as ammonium acetate or propionate. The salt form can be made by simple neutralization of the acid group with a base such as an amine, a quaternary ammonium hydroxide, an alkali metal carbonate or hydroxide, or the like; or alternatively by simple reaction of the amino group with a carboxylic acid, a sulfonic acid, a halo acid, or the like. Carboxylic acid groups in salt form are preferred because they have been found to impart water solubility to the chemical compositions of the present invention without causing undue loss of the durable stain-release properties imparted by the chemical composition.

The isocyanate-reactive hydrogen containing group is selected from the group consisting of —OH, —SH, $NH_2$, and NRH wherein R is selected from the group consisting of a phenyl group, a cycloaliphatic group, or a straight or branched aliphatic group having from about 1 to about 12 carbon atoms. Preferably, R is a lower alkyl group having from 1 to 4 carbon atoms. A representative suitable diol with a solubilizing group is 2,2-bis(hydroxymethyl)propionic acid and its salts such as its ammonium salt. A representative suitable monoalcohol with a solubilizing group is glycolic acid ($HOCH_2COOH$) and its salts. The amount of water-solubilizing group should be sufficient to solubilize the chemical composition.

Typically, the isocyanate:solubilizing group ratio should be from about 3:1 to about 16:1, preferably from about 5:1 to about 11:1. Illustrative water-solubilizing compounds having suitable water-solubilizing groups include, but are not limited to, those independently selected from the group consisting of $HOCH_2COOH$; $HSCH_2COOH$; $(HOCH_2CH_2)_2NCH_2COOH$; $HOC(CO_2H)(CH_2CO_2H)_2$; $(H_2N(CH_2)_nCH_2)_2NCH_3$ wherein n is an integer of 1 to 3; $(HOCH_2)_2C(CH_3)COOH$; $(HO(CH_2)_nCH_2)_2NCH_3$ wherein n is an integer of 1 to 3; $HOCH_2CH(OH)CO_2Na$; N-(2-hydroxyethyl) iminodiacetic acid ($HOCH_2CH_2N(CH_2COOH)_2$); L-glutamic acid ($H_2NCH(COOH)(CH_2CH_2COOH)$); aspartic acid ($H_2NCH(COOH)(CH_2COOH)$); glycine ($H_2NCH_2COOH$); 1,3-diamino-2-propanol-N,N,N',N'-tetraacetic acid ($HOCH(CH_2N(CH_2COOH)_2)_2$); iminodiacetic acid ($HN(CH_2COOH)_2$); mercaptosuccinic acid ($HSCH(COOH)(CH_2COOH)$); $H_2N(CH_2)_4CH(COOH)N(CH_2COOH)_2$; $HOCH(COOH)CH(COOH)CH_2COOH$; $(HOCH_2)_2CHCH_2COO)$—$(NH(CH_3)_3)^+$; $CH_3(CH_2)_2CH(OH)CH(OH)(CH_2)_3CO_2K$; $H_2NCH_2CH_2OSO_3Na$; $H_2C_2H_4NHC_2H_4SO_3H$; $H_2C_3H_6NH(CH_3)C_3H_6SO_3H$; $(HOC_2H_4)_2NC_3H_6OSO_3Na$; $(HOCH_2CH_2)_2NC_6H_4OCH_2CH_2OSO_2OH$; N-methyl-4-(2,3-dihydroxypropoxy)pyridinium chloride, $((H_2N)_2C_6H_3SO_3)$—$(NH(C_2H_5)_3)^+$; dihydroxybenzoic acid; 3,4-dihydroxybenzylic acid; 3-(3,5-dihydroxyphenyl)propionic acid; salts of the above amines, carboxylic acids, and sulfonic acids; and mixtures thereof.

The chemical compositions of the present invention can be made according to the following step-wise synthesis. As one skilled in the art would understand, the order of the steps is non-limiting and can be modified so as to produce a desired chemical composition. In the synthesis, the polyfunctional isocyanate compound, the reactable stabilizers, and the polyol are dissolved together under dry conditions, preferably in a solvent, and then heating the resulting solution at approximately 40 to 80° C. (preferably, approximately 60 to 70° C.) with mixing in the presence of a catalyst for one-half to two hours, preferably one hour.

Depending on reaction conditions (for example, reaction temperature and/or polyfunctional isocyanate used), a catalyst level of up to about 0.5 percent by weight of the polyfunctional isocyanate/polyol/stabilizer mixture may be used, but typically about 0.00005 to about 0.5 percent by weight is required, 0.02 to 0.1 percent by weight being preferred. Suitable catalysts include, but are not limited to, tertiary amine and tin compounds. Examples of useful tin compounds include tin II and tin IV salts such as stannous octoate, dibutyltin dilaurate, dibutyltin diacetate, dibutyltin di-2-ethylhexanoate, and dibutyltinoxide. Examples of useful tertiary amine compounds include triethylamine, tributylamine, triethylenediamine, tripropylamine, bis(dimethylaminoethyl) ether, morpholine compounds such as ethyl morpholine, and 2,2'-dimorpholinodiethyl ether, 1,4-diazabicyclo[2.2.2]octane (DABCO, Sigma-Aldrich Chemical Co., Milwaukee, Wis.), and 1,8-diazabicyclo[5.4.0.]undec-7-ene (DBU, Sigma-Aldrich Chemical Co., Milwaukee, Wis.). Tin compounds are preferred.

A mixture of polyols can be used instead of a single polyol. For example, in a preferred embodiment a polyol mixture comprising a polyol with a water-solubilizing group and a polyol with an $R_f$ group is used. When the polyfunctional isocyanate compound is a triisocyanate, the polyol is preferably a diol to prevent undesired gelation, which can occur when polyols having three or more hydroxyl groups are reacted with a triisocyanate.

The resulting isocyanate functional urethane oligomers and compounds are then further reacted with one or more of the monoalcohols described above, along with the reactive stabilizers. The monoalcohol(s) is (are) added to the above reaction mixture, and react(s) with a substantial portion of the remaining NCO groups. The above temperatures, dry conditions, and mixing are continued one-half to two hours (preferably, one hour). Terminal fluorine-containing and/or long-chain hydrocarbon groups and stabilizer moieties are thereby bonded to the isocyanate functional urethane oligomers and compounds.

These oligomers and compounds are further functionalized with silane groups described above by reacting a portion or all of the remaining NCO groups in the resulting mixture with one or more of the isocyanate-reactive silane compounds described above. Thus, the silane compound(s) is (are) added to the reaction mixture, using the same conditions as with the previous additions. Aminosilanes are preferred, because of the rapid and complete reaction that occurs between the —NCO groups and the silane compound's amino groups. Isocyanato functional silane compounds may be used and are preferred when the ratio of polyfunctional isocyanate compound to the polyol and monoalcohol is such that the resulting oligomer has a terminal hydroxyl group.

Water-solubilizing compounds can be added and reacted with all or a portion of the —NCO groups under the conditions described above in any of the steps described above. For example, as mentioned above, the water-solubilizing compound can be added as a mixture with the polyol. Alternatively, the water-solubilizing compound can be added after reaction of the polyol with the polyfunctional isocyanate, as a mixture with the monoalcohol(s), after reaction of the polyol and monoalcohol with the polyfunctional isocyanate, as a mixture with the silane, or after the reaction of the polyol, monoalcohol, and silane with the polyfunctional isocyanate.

When the water-solubilizing compound is a monoalcohol, it is preferably added as a mixture with the fluorine-containing monoalcohol or the long-chain hydrocarbon monoalcohol. When the water-solubilizing compound is a diol, it is preferably added as a mixture with the polyol.

When the chemical composition of the present invention contains a urethane oligomer having one or more carboxylic acid groups, solubility of the composition in water can be further increased by forming a salt of the carboxylic acid group(s). Basic salt-forming compounds, such as tertiary amines, quaternary ammonium hydroxides, and inorganic bases, including, for example, those selected from the group consisting of sodium hydroxide, potassium hydroxide, cesium hydroxide, lithium hydroxide, calcium hydroxide, magnesium hydroxide, zinc hydroxide, and barium hydroxide, can be used in a sufficient amount (that is, in an amount to maintain a pH of greater than about 6). These basic salt-forming compounds preferably can be added in the water phase, but optionally in the preparation of the urethane oligomers, to form salts with the incorporated, pendant and/or terminal carboxylic acid groups on the urethane oligomer.

Examples of useful amine salt-forming compounds include, for example, those selected from the group consisting of ammonia, trimethylamine, triethylamine, tripropylamine, triisopropylamine, tributylamine, triethanolamine, diethanolamine, methyldiethanolamine, morpholine, N-methylmorpholine, dimethylethanolamine, and mixtures thereof.

Preferred salt forming compounds include, for example, those selected from the group consisting of ammonia, trimethylamine, dimethylethanolamine, methyldiethanolamine, triethylamine, tripropylamine, and triisopropylamine, since the chemical compositions prepared therefrom are not excessively hydrophilic upon coating and curing.

Because certain salts formed by the reaction of salt forming compounds, such as potassium hydroxide in combination with a carboxylic acid group, could result in undesired reaction with NCO groups, it is preferred to add the salt forming compound in a water phase after all of the diols, alcohol, and silane compounds have been reacted with the NCO groups of the polyfunctional isocyanate compound.

The molar ratios of the components of the chemical composition of the present invention are approximately as follows:

one or more polyfunctional isocyanate compounds and one or more polyols are used in a molar ratio of from about 1:0.25 to about 1:0.45;

one or more polyfunctional isocyanate compounds and one or more monoalcohols are used in a molar ratio of from about 1:0.30 to about 1:0.60;

one or more polyfunctional isocyanate compounds and one or more silanes are used in a molar ratio of from about 1:0.001 to about 1:0.15;

one or more polyfunctional isocyanate compounds and one or more stabilizers are used in a molar ratio of from about 1:0.001 to about 1:0.1; and one or more polyfunctional isocyanate compounds and one or more water-solubilizing compounds are used in a molar ratio of from about 1:0 to about 1:1.6.

The molar ratios of the components of the chemical composition of the present invention are preferably as follows:

one or more polyfunctional isocyanate compounds and one or more polyols are used in a molar ratio of from about 1:0.35 to about 1:0.42;

one or more polyfunctional isocyanate compounds and one or more monoalcohols are used in a molar ratio of from about 1:0.45 to about 1:0.55;

one or more polyfunctional isocyanate compounds and one or more silanes are used in a molar ratio of from about 1:0.03 to about 1:0.08;

one or more polyfunctional isocyanate compounds and one or more stabilizers are used in a molar ratio of from about 1:0.01 to about 1:0.05; and one or more polyfunctional isocyanate compounds and one or more water-solubilizing compounds are used in a molar ratio of from about 1:0 to about 1:1.0.

These molar ratio ranges also apply to the coating compositions, articles, and methods of the invention.

The chemical compositions of the invention can be used in coating compositions such as, for example, a sprayable coating composition comprising the chemical composition of the invention and a diluent.

Suitable diluents include, for example, water, alcohols, esters, glycol ethers, amides, ketones, hydrocarbons, chlorohydrocarbons, chlorocarbons, and miscible mixtures thereof. Preferably, the diluent is water, an organic solvent, or miscible mixtures thereof; more preferably, the diluent is water.

Useful alcohol solvents include, but are not limited to, amyl alcohol, n-butanol, diisobutyl carbinol, ethanol, 2-ethylhexanol, hexylene glycol, isobutanol, isopropanol, amyl alcohol, 2-methyl butanol, n-pentanol, n-propanol, and mixtures thereof.

Useful ester solvents include, but are not limited to, amyl acetate, n-butyl acetate, t-butyl acetate, Butyl CARBITOL™ Acetate ($C_4H_9O(C_2H_4O)_2C(O)CH_3$), Butyl CELLOSOLVE™ Acetate ($C_4H_9OCH_2CH_2OC(O)CH_3$), CELLOSOLVE™ Acetate ($C_2H_5OCH_2CH_2°$ C. $(O)CH_3$), methyl acetate, ethyl acetate, isopropyl acetate, isobutyl acetate, Methyl PROPASOL™ Acetate ($CH_3OCH_2CH(CH_3)OC(O)CH_3$), n-propyl acetate, n-butyl propionate, UCAR™ Ester EEP ($C_2H_5OC_2H_4OC(O)CH_2CH_3$), UCAR™ Filmer IBT (($CH_3)_2CHCH(OH)C(CH_3)_2CH_2°$ C. $(O)CH(CH_3)_2$), n-pentyl propionate, and dibasic esters such as dimethyl succinate, dimethyl glutarate, dimethyl adipate, and mixtures thereof.

Useful glycol ether solvents include, but are not limited to, butoxytriglycol ($C_4H_9O(C_2H_4O)_3H$), Butyl CARBITOL™ ($C_4H_9O(C_2H_4O)_2H$), Butyl CELLOSOLVE™ ($C_4H_9OCH_2CH_2OH$), CARBITOL™ ($C_2H_5O(C_2H_4O)_2H$), CELLOSOLVE™ ($C_2H_5OCH_2CH_2OH$), poly (ethylene glycol) butyl ether (ECOSOFT™ Solvent PB, $C_4H_9O(C_2H_4O)_nH$), poly(ethylene glycol) ethyl ether (ECOSOFT™ Solvent PE $C_2H_5O(C_2H_4O)_nH$), poly(ethylene glycol) hexyl ether (ECOSOFT™ Solvent PH $C_6H_{11}O(C_2H_4O)H$), ethoxytriglycol ($C_2H_5O(C_2H_4O)_3H$), Hexyl CARBITOL™ ($C_6H_{13}O(C_2H_4O)_2H$), Hexyl CELLOSOLVE™ ($C_6H_{13}OCH_2CH_2OH$), methoxytriglycol ($CH_3O(C_2H_4O)_3H$), Methyl CARBITOL™ ($CH_3O(C_2H_4O)_2H$), Methyl CELLOSOLVE™ ($CH_3OCH_2CH_2OH$), Propyl CELLOSOLVE™ ($C_3H_7OCH_2CH_2OH$), and mixtures thereof.

Useful amide solvents include, but are not limited to, dimethyl acetamide, N-methylpyrrolidone, mixtures thereof, and the like. Useful ketone solvents include, but are not limited to, acetone, diacetone alcohol (($CH_3)_2C(OH)CH_2C(O)CH_3$), diisobutyl ketone, isobutyl heptyl ketone (ECOSOFT™ Solvent IK, ($CH_3)_2CHCH_2C(O)CH_2CH(CH_3)CH_2CH(CH_3)$ 2), isophorone, methyl ethyl ketone, methyl n-amyl ketone, methyl isobutyl ketone, mixtures thereof, and the like.

Useful hydrocarbon solvents include, but are not limited to, toluene, xylene, mixtures thereof, and the like. Useful chlorohydrocarbon solvents include, but are not limited to, 4-chlorotrifluoromethylbenzene, 3,4-bis(dichloro)trifluoromethylbenzene, mixtures thereof, and the like.

The preceding trademarked solvents are trademarked by Union Carbide, and are available from Union Carbide (Danbury, Conn.) or Sigma-Aldrich (Milwaukee, Wis.).

The coating compositions of the invention typically contain from about 0.1 to about 10 percent chemical composition based on the weight of the coating composition (preferably, from about 1 to about 5 weight percent; more preferably, from about 2 to about 3 weight percent).

Preferably, the coating compositions further comprise an acrylic polymer or a styrene/acrylic copolymer resin. Suitable resins include, for example, Rhoplex™ CS-4000 acrylic polymer (Rohm Haas), Rhoplex™ CS-3800 styrene/acrylic copolymer (Rohm Haas), Rholpex™ 2133 acrylic polymer (Rohm Haas), Rhoplex™ WL-91 acrylic polymer (Rohm Haas), Carboset CR-760 styrene/acrylic copolymer (Noveon Specialty Chemicals, Cleveland, Ohio), Carboset CR-761 styrene/acrylic copolymer (Noveon Specialty Chemicals, Cleveland, Ohio), Carboset CR-763 styrene/acrylic copolymer (Noveon Specialty Chemicals, Cleveland, Ohio), Carboset CR-785 acrylic polymer (Noveon Specialty Chemicals, Cleveland, Ohio), AcryGen™ D541 (Omnova Solutions, Chester, S.C.), AcryGen™ M630 (Omnova Solutions, Chester, S.C.), and Mor-glo™ CS styrene acrylic copolymer (Omnova Solutions, Chester, S.C.). The coating composition can typically contain from about 5 to about 40 weight percent (preferably, from about 5 to about 25 weight percent) acrylic polymer or styrene/acrylic copolymer resin.

The coating compositions of the invention can optionally comprise biocides (for example, mildicides, fungicides, or algicides) to inhibit the growth of biological material such as algaes, mildews, and molds on coated substrates. A preferred biocide, for example, is zinc pyridenethione. Additionally, it may be desirable to add surfactants, anti-foam agents, anti-slip particles, and/or colorants (for example, stains or pigments).

The coating compositions can be applied to a variety of substrates including, but not limited to, hard and fibrous substrates (preferably, hard substrates). Hard substrates include, for example, glass, ceramic, masonry, concrete, natural stone, man-made stone, metals, wood, plastics, and painted surfaces. Fibrous substrates include, for example, woven, knit, and nonwoven fabrics, textiles, carpets, leather, and paper. Preferred substrates are capable of imbibing a liquid and are therefore porous. Such substrates are particularly subject to staining and soiling, but also benefit greatly from the chemical compositions of the present invention because the coating composition can penetrate into the porous substrate surface. Substrates comprising nucleophilic groups selected from the group consisting of —OH and —NHR, wherein R is H or lower alkyl are also preferred because they can bond to the silane groups of the chemical compositions of the present invention increasing durability. Substrates of this type include those having siliceous and metallic surfaces. The coating compositions can also be applied to a variety of articles by applying the coating to at least one surface of the article.

Representative examples of substrates and articles that can be coated with the coating compositions include signs; decorative surfaces (for example, wallpaper and vinyl flooring); composite or laminated substrates such as FORMICA™ brand sheeting (Formica Corp., Warren, N.J.) or laminated flooring (for example, PERGO™ brand flooring (Pergo Inc., Raleigh, N.C.)); concrete flooring (such as in a garage or basement); ceramic tile and fixtures (for example, sinks, showers, toilets); natural and man-made stones and tiles; decorative and paving stones; concrete block; concrete brick; cement brick; cement and stone sidewalks, patios, walkways, and concrete driveways; particles that comprise grout or the finished surface of applied grout; wood furniture surface (for example, desktops, tabletops); cabinet surfaces; wood flooring, decking, and fencing; leather; paper; fiber glass fabric and other fiber-containing fabrics; textiles; carpeting; and the like.

Since coatings prepared from the coating compositions can render metal surfaces resistant to soils, the optical properties of metal surfaces like those on decorative metal strips and mirrors can be preserved longer. The coating compositions can make wood surfaces more resistant to food and beverage stains while helping to maintain a lustrous appearance. In addition, the coating compositions can be applied as a protective coating on aircraft wings, boat hulls, fishing line, medical surfaces, and siding, and can be used in food release, mold release, adhesive release applications, and the like. Decorative stones include, for example, marble, granite, limestone, slate, and the like.

It is desirable to avoid the formation of mildew and algae on decorative stone, concrete, tile, and grout for aesthetic and functional purposes. Application of the coating compositions of the present invention to stone eliminates the formation of mildew and algae for several months on near-horizontal surfaces.

Preferred substrates that can be coated with the coating composition of the present invention are hard, porous substrates, such as decorative and paving stones; concrete and stone sidewalks and driveways; particles that comprise grout or the finished surface of applied grout, wood furniture surface (desktops, tabletops); cabinet surfaces; wood flooring, decking, and fencing; and the like.

To impart stain resistance to a substrate or an article, the coating compositions can be applied to one or more surfaces of the substrate or article and then allowed to cure. Any method of application that produces a thin coating of the coating composition can be used. For example, the coating composition can be applied by rolling, brushing, spraying, padding, dipping, spin-coating, or flow coating. After the substrate is coated with the coating composition, the coated substrate can be dried at ambient temperature or at an elevated temperature.

The coating compositions can be applied to a substrate or article in any desired thickness. Coatings as thin as a few microns can offer low surface energy, stain-resistance, and stain-release. However, thicker coatings (for example, up to about 20 microns or more) can also be used. Thicker coatings can be obtained by applying a single thicker layer of a coating composition that contains a relatively high concentration of the chemical composition of the present invention. Thicker coatings can also be obtained by applying successive layers of a coating composition that contains a relatively low concentration of the chemical composition of the present invention. The latter can be done by applying a layer of the coating composition, and then drying prior to application of a successive layer. Successive layers of the coating can then be applied to dried layers. This procedure can be repeated until the desired coating thickness is achieved.

After the substrate or article is coated with the coating composition, the coating is dried, preferably at ambient temperature or at an elevated temperature, more preferably at ambient temperature, to provide a cured coating. The coating composition is "cured" when dried and the solvent is evaporated and a cured coating is provided. This cure preferably takes place at approximately 15 to 35° C. (that is, ambient temperature) until dryness is achieved, up to approximately 24 hours. During this time, and over a subsequent period of time, the chemical composition can also form chemical bonds with the substrate and between molecules of the chemical composition.

The resulting coated substrates or articles coated with a cured coating, derived from at least one diluent and a chemical composition of the present invention, have been found to be durable, to be non-staining and/or to release stains with simple washing methods, and to have increased resistance to weathering and photodegradation.

EXAMPLES

Objects and advantages of this invention are further illustrated by the following examples, but the particular materials and amounts thereof recited in these examples, as well as other conditions and details, should not be construed to unduly limit this invention.

Concrete Panels

Two types of concrete panel samples were obtained. The first type, "Hage" panels, was obtained from Hage Concrete, Edina, Minn. Hage panels had dimensions of 8.0 in (20.3 cm)×8.0 in (20.3 cm)×0.5 in (1.3 cm). The second type, "Stork" panels, was obtained from Stork, St Paul, Minn. Stork panels had dimensions of 5.75 in (14.6 cm) by 2.75 in (7.0 cm) by 0.5 in (1.3 cm). Both Hage and Stork panels were prepared using concrete sand, Type I cement, and water to yield 4000 psi concrete. On the Stork panels, the concrete was finished using either a steel trowel (smooth) or broom (rough). Stork panels were conditioned at 72° F. and 100% relative humidity for one week. On the Hage panels, the concrete was finished using a steel trowel (smooth). Hage panels were conditioned at ambient temperature and relative humidity for at least one week prior to testing.

Coating Method

An aqueous solution of test composition to be evaluated was coated onto the surface of the panels by applying the solution with a disposable sponge paintbrush until the surface was uniformly saturated. Each of the resulting coated panels was then allowed to dry at ambient laboratory temperature and humidity for at least 12 hours before testing.

Test Method I: Accelerated Aging Test

The coated panels were placed into an Atlas Weatherometer, Model Ci 5000 (available from Atlas Testing Solutions, Chicago, Ill.). The test method followed was VA modified ASTM G155 cycle 1 with a black panel temperature of 70° C., using daylight filters in a water-cooled xenon arc lamp. Weathered panels were typically tested after exposure to accelerated weathering for 2340, 3510, and 4680 kilojoules/m$^2$ at 340 nm.

Test Method II: Percent Wetting Test

The coated panels were positioned horizontally and a single drop of each test fluid was separately placed onto each panel. After allowing the test fluid to set for 30 minutes, the darkened area that wetted-out under the test fluid drop was measured, and the percentage of wetting was calculated. A small percentage of wetting is indicative of better liquid resistance and therefore improved protection against the test fluid. The following test fluids were used:
(1) Antifreeze (AF)
(2) PENNZOIL™ ATF Automatic transmission fluid (TF) (available from Pennzoil-Quaker State Co., Houston, Tex.)
(3) Salt Water Solution (6%; aqueous) (SW)
(4) Used 10W30 motor oil (Oil).

Test Method III—Stain Test

A spot test was used to visually rate the ability of coated panels to prevent a test fluid drop from staining the concrete after a given exposure period. The following test fluids were used:
(1) Antifreeze (AF)
(2) PENNZOIL™ ATF Automatic transmission fluid (TF) (available from Pennzoil-Quaker State Co., Houston, Tex.)
(3) Salt Water Solution (6%; aqueous) (SW)
(4) Used 10W30 motor oil (Oil).

Two drops of each of the test fluids were placed on each of the coated panels to be tested. After a specified period of time, the panels were wiped with a paper towel and the visual appearance of the spot where each drop of test fluid had been placed was rated on a scale of 0-4, as described by:
0=no visible stain
1=trace of stain visible
2=outline of drop visible
3=dark outline of drop
4=dark stain which has spread.

The average rating of the two drops of each test fluid was reported.

Test Method IIIA—Comparative Stain Test

Test Method III described above was followed, with the exceptions that the ratings for two spots of each weathered and non-weathered were averaged. Averaged values for non-weathered concrete samples ($V_{non-weathered}$) were subtracted from average values for weathered concrete samples ($V_{weathered}$), to yield a comparative stain resistance value ($V_{comp}$).

$$(V_{weathered})-(V_{non-weathered})=(V_{comp})$$

A lower rating represents a decreased rate of weathering and therefore better stain-release performance of a chemical composition treatment of the concrete surface than a higher rating.

Glossary Table

| Designator | Description, Formula and/or Structure | Availability |
| --- | --- | --- |
| APTES | 3-Aminopropyltriethoxysilane; $NH_2CH_2CH_2CH_2Si(OC_2H_5)_3$ | Sigma-Aldrich, Milwaukee, WI |
| CGL 052 | Reactable hindered amine light stabilizer | Ciba Specialty Chemicals, Tarrytown, NJ |
| CS-4000 | Acrylic polymer latex | Rohm and Haas |
| $C_{12}H_{25}OH$ | 1-dodecanol | Sigma-Aldrich |
| GA | Glycolic acid | Sigma-Aldrich |
| HMP | 2,2-bis(hydroxymethyl)propionic acid; $CH_3C(CH_2OH)_2COOH$ | Sigma-Aldrich |
| Irganox 1135 | Antioxidant | Ciba Specialty Chemicals |
| N-3300 | DESMODUR ™ N-3300 | Bayer Corp, Pittsburgh, PA |
| PGPE | Propylene gycol phenyl ether | Sigma-Aldrich |
| Tinuvin ™ 405 | Reactable UV absorber | Ciba Specialty Chemicals |
| Tinuvin ™ 571 | UV absorber | Ciba Specialty Chemicals |
| Tinuvin ™ 765 | Hindered amine light stabilizer | Ciba Specialty Chemicals |
| Tinuvin ™ 1130 | Reactable UV absorber | Ciba Specialty Chemicals |

Preparation of $C_4F_9SO_2N(CH_3)CH_2CH_2OH$ (MeFBSE)

MeFBSE having an equivalent weight of 357, was made in two stages by reacting perfluorobutanesulfonamide with methylamine and ethylenechlorohydrin, using a procedure essentially as described in Example 1 of U.S. Pat. No. 2,803,656 (Ahlbrecht, et al.).

Preparation 1: N-3300/HMP/MeFBSE/APTES; 44.9/5.7/46.8/2.6

A 1 L flask equipped with a heating mantle, mechanical agitator, nitrogen inlet, condenser and a temperature controller was charged with N-3300 (57.1 g), HMP (7.2 g) and ethyl acetate (160.0 g), and was heated to 50° C. Dibutyltin dilaurate (1.0 gram) was added and the mixture was heated at 60° C. for one hour. MeFBSE (59.5 g) was added, and the reaction was continued at 60° C. for another two hours before adding APTES (3.3 g), and allowed to react at 60° C. for an additional 3 hours. Dipropylene glycol monomethyl ether (41 g) was added and mixed for 5 minutes. Methyldiethanolamine (6.5 g) was added and mixed for additional 10 minutes. Deionized water (DI) (500 g) water was added. The ethyl acetate was then distilled off at reduced pressure to give the aqueous based urethane (18.3% solid).

Preparation 2: N-3300/HMP/$C_{12}H_{25}$OH/GA/APTES

In a 250 ml flask equipped with a magnetic stirrer, heating mantle, temperature controller, and nitrogen inlet, was added N-3300 (13.26 g; 0.020 mole, 0.068 equivalent), HMP (1.34 g; 0.01 mole; 0.02 equivalent —OH; 0.01 equivalent —COOH), 4 drops of dibutyltin dilaurate, and 66 g ethyl acetate. The resulting mixture was stirred and heated at 60° C. for one hour, followed by addition of $C_{12}H_{25}$OH (5.766 g; 0.031 mole; 0.031 equivalents), and GA (1.14 g; 0.015 mole; 0.015 equivalent). The resulting reaction mixture was heated for another hour at 60° C., followed by addition of APTES (0.442 g; 0.0020 mole; 0.0020 equivalent), and heated with stirring at 60° C. for an additional two hours. A 5 g portion of the resulting unneutralized chemical composition was taken for GPC analysis, and the remaining composition was then neutralized by adding to the composition an amount of methyldiethanolamine equivalent to the number of equivalents of carboxylic acid groups present. A portion (46.0 g) of the neutralized chemical composition was mixed with water (110.0 g), and ethyl acetate was stripped from the solution using a rotary evaporator. The resulting clear solution (98.0 g) contained about 14% (by weight) of N3300/HMP/$C_{12}H_{25}$OH/GA/APTES.

Preparation 3 (containing 2% CGL 052 and 2% Tinuvin™ 1130 by weight)

Preparation 3 was prepared using essentially the same method described in Preparation 2 with the exception that CGL 052 (0.22 g) and Tinuvin™ 1130 (0.22 g), were added to the initial charge respectively and the charge of GA was reduced (1.08 g).

Preparation 4 (containing 2% of CGL 052 and 2% of Tinuvin™ 1130 by weight)

A 1 L flask equipped with a heating mantle, mechanical agitator, nitrogen inlet, condenser and a temperature controller was charged with N-3300 (57.1 g), HMP (7.2 g), CGL 052 (2.80 g), Tinuvin™ 1130 (2.80 g), and ethyl acetate (160.0 g), and was heated to 50° C. Dibutyltin dilaurate (1.0 gram) was added, and the mixture was heated at 60° C. for one hour. MeFBSE (59.5 g) was added, and the stirring was continued at 60° C. for another two hours before adding 3-aminopropyltriethoxysilane (3.3 g). At that time the reaction was allowed to stir at 60° C. for an additional 3 hours. Dipropylene glycol monomethyl ether (41.0 g) was added and mixed for 5 minutes. Methyldiethanolamine (6.5 g) was added and mixed for additional 10 minutes. DI water (500 g) was added. Ethyl acetate was then distilled off at reduced pressure to yield the aqueous based urethane (18.3% solid).

Preparation 5 (containing 2% of CGL 052 and 2% of Tinuvin™ 405 by weight)

Preparation 5 was prepared using essentially the same method described in Preparation 4 with the exception that Tinuvin™ 1130 was replaced by an equal weight amount of Tinuvin™ 405.

Preparation 6 (containing 2% CGL 052 and 2% Tinuvin™ 405 by weight)

Preparation 6 was prepared using essentially the same method described for Preparation 3 with the exception that Tinuvin™ 1130 was replaced by an equal weight amount of Tinuvin™ 405.

TABLE 1

Test Compositions for Examples 1-6 and Comparative Examples C1-C6.

| Example | Total % Solids | Preparation (%) | Preparation (%) | Other additives |
|---|---|---|---|---|
| 1 | 4.0% | Prep 4 (4.0%) | — | — |
| 2 | 4.0% | Prep 4 (4.0%) | — | — |
| 3 | 7.0% | Prep 3 (6.3%) | Prep 4 (0.7%) | — |
| 4 | 7.0% | Prep 3 (6.3%) | Prep 5 (0.7%) | — |
| 5 | 7.0% | Prep 6 (6.3%) | Prep 4 (0.7%) | — |
| 6 | 7.0% | Prep 6 (6.3%) | Prep 5 (0.7%) | — |
| C1 | 4.0% | Prep 1 (4.0%) | — | — |
| C2 | 4.0% | Prep 1 (4.0%) | — | — |
| C3 | 7.0% | Prep 2 (6.3%) | Prep 1 (0.7%) | |
| C4 | 5.5% | Prep 2 (5.0%) | Prep 1 (0.5%) | with 0.07% of a 1:1:0.5 mixture of Tinuvin ™ 571:Tinuvin ™ 765:Irganox ™ 1135 |
| C5 | 5.5% | Prep 2 (5.0%) | Prep 1 (0.5%) | |

Examples 1-2 and Comparative Examples C1-C2

For the preparation of Examples 1 and 2, an aliquot of Preparation 4 was diluted with water to 4%, and applied according to the Coating Method described above. For Examples C1 and C2, an aliquot of Preparation 1 was diluted with water to 4% and applied to the panels according to the Coating Method described above. The coated panels were dried at ambient temperature and humidity for at least 24 hours, subjected to weathering for 1170 kilojoules/m$^2$ at 340 nm according to Test Method I, and tested for staining according to Test Method IIIA described above. The type of panel used and resulting ($V_{comp}$) values for Example 1-2 and Comparative Examples $C_1$-$C_2$ are listed in Table 2.

TABLE 2

Comparative Stain Values ($V_{comp}$) using Test Method IIIA for Examples 1-2 and Comparative Examples C1-C2.

| | | Time drop resides on surface before measurement | | | | | | | | |
|---|---|---|---|---|---|---|---|---|---|---|
| Sample | | 1 hour | | | | 3 hour* | | | 15 hour* | |
| Ex. | Panel | Oil | TF | AF | SW | Oil | TF | | Oil | TF |
| 1 | Smooth Hage | 0 | 0 | 0 | 1.0 | 1.25 | 2.0 | | 1.0 | 1.0 |
| C1 | Smooth Hage | 0.25 | 0.75 | 2.0 | 2.0 | 2.25 | 2.5 | | 1.5 | 1.5 |
| 2 | Smooth Stork | 1.25 | 0.5 | 0.5 | 1.0 | 1.0 | 2.0 | | 0.75 | 1.25 |
| C2 | Smooth Stork | 1.5 | 1.5 | 1.0 | 1.0 | 3.0 | 2.5 | | 4.0 | 3.75 |

*Data was not recorded for aqueous solutions (AF and SW) due to influence of solution evaporation at time periods greater than 1 hour.

The data in Table 2 indicate that the compositions of the invention significantly reduce the rate of weathering, and therefore improve stain resistance, of concrete panels.

Examples 3-6 and Comparative Examples C3-C5

Examples 3-6 and Comparative Examples C3-C5 were prepared as described in Table 1 and the preparations were applied to Stork panels (smooth) according to the Coating Method described above. The coated samples were dried at ambient temperature and humidity for at least 24 hours. After that, the samples were weathered according to Test Method I, and Percent Wetting was determined according to Test Method II. Results are listed in Table 3.

TABLE 3

Percent Wetting values for Examples 3-5 and Comparative Examples C3-C5 using Test Method II.

| | Exposure in Weatherometer | | | | | | | | | | | |
|---|---|---|---|---|---|---|---|---|---|---|---|---|
| | 2340 kJ/m$^2$@340 nM | | | | 3510 kJ/m$^2$@340 nM | | | | 4680 kJ/m$^2$@340 nM | | | |
| Ex | AF | TF | SW | Oil | AF | TF | SW | Oil | AF | TF | SW | Oil |
| 3 | 50 | 13 | 43 | 0 | 17 | 3 | 43 | 0 | 92 | 42 | 92 | 48 |
| 4 | 32 | 8 | 58 | 0 | 23 | 3 | 33 | 2 | 100 | 38 | 65 | 13 |
| 5 | 22 | 13 | 30 | 10 | 28 | 5 | 77 | 3 | 40 | 42 | 89 | 12 |
| 6 | 83 | 22 | 33 | 2 | 37 | 8 | 100 | 4 | 75 | 29 | 50 | 8 |
| C3 | 90 | 90 | 100 | 28 | 100 | 100 | 100 | 100 | 100 | 100 | 100 | 100 |
| C4 | 80 | 100 | — | 100 | — | — | — | — | — | — | — | — |
| C5 | 30 | 100 | — | 30 | — | — | — | — | — | — | — | — |

The data in Table 3 indicate that compositions of the invention generally improve the Percent Wetting of weathered concrete panels.

Examples 7-15 and Comparative Examples C6 & C7

A 50 mL beaker fitted with a stirrer was charged with CS-4000, Preparation 4, PGPE and water in the amounts to arrive at the weight percentages listed in Table 4. The test solution was then applied to Stork panels (smooth and rough) according to the Coating Method listed above. The coated panels were then tested according to Test Method III. The resulting Stain Test data for transmission fluid (TF), dirty motor oil (Oil) and antifreeze (AF) are listed in Table 4.

TABLE 4

Results from Test Method III - Stain Test (24 hr) on smooth and rough Hage concrete.

| | CS-4000 | Prep 4 | PGPE | Smooth Stork Panel | | | Rough Stork Panel | | |
|---|---|---|---|---|---|---|---|---|---|
| Ex | (%) | (%) | (%) | TF | Oil | AF | TF | Oil | AF |
| 7 | 19.9 | 0.1 | 4.0 | 0 | 0 | 2.5 | 0 | 1 | 2 |
| 8 | 19.0 | 1.0 | 4.0 | 0 | 0 | 2.5 | 0 | 1 | 2.5 |
| 9 | 19.0 | 1.0 | 4.0 | 0.5 | 0 | 3 | 0 | 0 | 2 |
| 10 | 18.0 | 2.0 | 4.0 | 0 | 0 | 3.5 | 1 | 1 | 3 |
| 11 | 14.0 | 1.0 | 4.0 | 0 | 0 | 3 | 1 | 1 | 3.5 |
| 12 | 13.0 | 2.0 | 4.0 | 0 | 0 | 3 | 0 | 0 | 2.5 |
| 13 | 9.0 | 1.0 | 4.0 | 0.5 | 0 | 2.5 | 1 | 0.5 | 2.0 |
| 14 | 9.0 | 1.0 | 2.0 | 0 | 0 | 2.5 | 2 | 1 | 2 |
| 15 | 8.0 | 2.0 | 4.0 | 0 | 0 | 2 | 0 | 1 | 2.5 |
| C6 | 20.0 | — | 4.0 | * | * | * | * | * | * |
| C7 | 19.99 | 0.01 | 4.0 | 1.5 | 1.5 | 3.5 | * | * | * |

*Liquid drops were not readable. The liquids ran together and absorbed into the concrete panels after 24 hours.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. A chemical composition comprising one or more urethane oligomers of at least two polymerized units, wherein said oligomers comprise the reaction product of:

(a) one or more polyfunctional isocyanate compounds,
(b) one or more polyols,
(c) one or more monoalcohols selected from the group consisting of fluorocarbon monoalcohols, optionally substituted long-chain hydrocarbon monoalcohols, and mixtures thereof,
(d) one or more silanes of the following formula:

$$X—R^1—Si—(Y)_3$$

wherein
X is an isocyanate reactive group selected from —NH$_2$, —SH, —OH, or —NRH, where R is selected from the group consisting of phenyl, straight and branched aliphatic, alicyclic, and aliphatic ester groups,
R$^1$ is an alkylene, heteroalkylene, aralkylene, or heteroaralkylene group, and
each Y is independently a hydroxyl, a hydrolyzable moiety selected from the group consisting of alkoxy, acyloxy, heteroalkyoxy, heteroacyloxy, halo, and oxime, or a non-hydrolyzable moiety selected from the group consisting of phenyl, alicyclic, straight-chain aliphatic, and branched-chain aliphatic, wherein at least one Y is a hydrolyzable moiety, and
(e) one or more stabilizers selected from the group consisting of UV absorbers comprising one or more isocyanate-reactive groups and HALS comprising one or more isocyanate-reactive groups.

2. The chemical composition of claim 1 wherein said oligomers further comprise the reaction product of (f) one or more water-solubilizing compounds comprising one or more water-solubilizing groups and at least one isocyanate-reactive group.

3. The chemical composition of claim 2 wherein said polyfunctional isocyanate compound is a diisocyanate or triisocyanate.

4. The chemical composition of claim 3 wherein said polyfunctional isocyanate compound is a diisocyanate and said polyol is a mixture of diol and triol.

5. The chemical composition of claim 3 wherein said polyfunctional isocyanate compound is a triisocyanate and said polyol is a diol.

6. The chemical composition of claim 2 wherein said fluorochemical monoalcohol is a compound of the following formula:

$$R_f—Z—R^2—OH$$

wherein:
R$_f$ is a perfluoroalkyl group or a perfluoroheteroalkyl group,
Z is a connecting group selected from a covalent bond, a sulfonamido group, a carboxamido group, a carboxyl group, or a sulfonyl group, and
R$^2$ is a divalent straight- or branched-chain alkylene, cycloalkylene, or heteroalkylene group of 1 to 14 carbon atoms.

7. The chemical composition of claim 6 wherein said R$_f$ is a perfluoroalkyl group of 2 to 6 carbons.

8. The chemical composition of claim 2 wherein said monoalcohol is an unsubstituted long-chain hydrocarbon monoalcohol.

9. The chemical composition of claim 2 wherein said water-solubilizing compound is a compound of the formula:

$$W—R^1—X$$

wherein
W is one or more water-solubilizing groups,
X is an isocyanate-reactive group selected from the group consisting of —NH$_2$, —SH, —OH, and —NRH, where R is selected from the group consisting of phenyl, straight and branched aliphatic, alicyclic, and aliphatic ester groups, and
R$^1$ is selected from the group consisting of alkylene, heteroalkylene, aralkylene, and heteroaralkylene groups.

10. The chemical composition of claim 2 wherein said water-solubilizing groups of said water-solubilizing compounds are selected from the group consisting of carboxylate, sulfate, sulfonates, phosphate, phosphonate, ammonium, and quaternary ammonium groups.

11. The chemical composition of claim 1 wherein said isocyanate-reactive groups of said stabilizer are hydroxyl groups.

12. The chemical composition of claim 11 wherein said stabilizer is selected from the group consisting of:

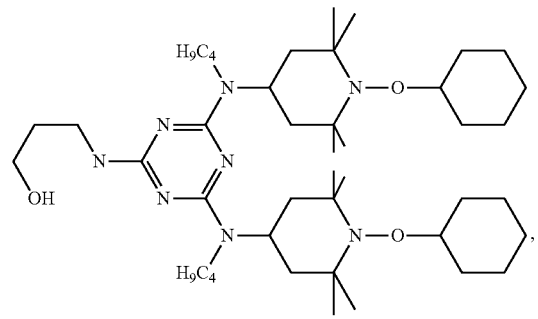

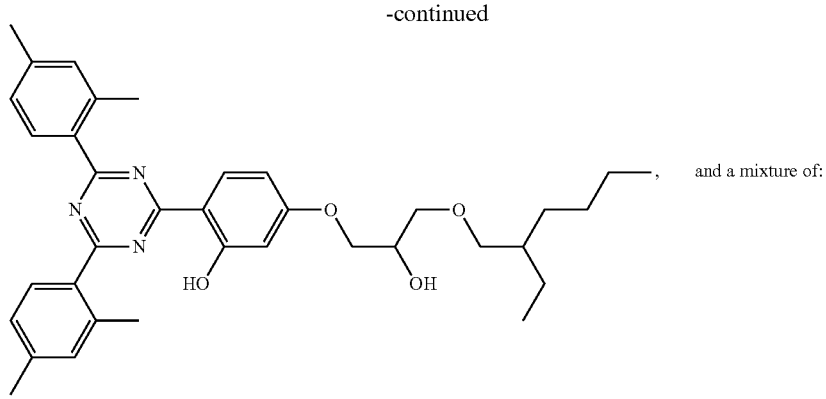

, and a mixture of:

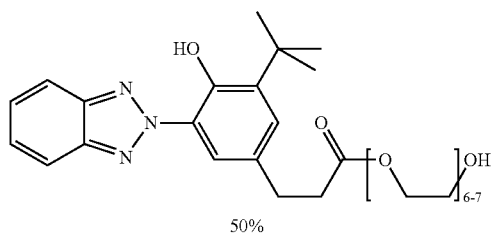

50%

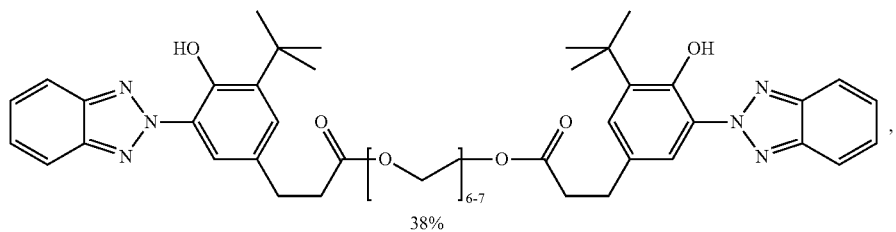

38% and H(OCH$_2$CH$_2$)$_{6-7}$OH, 12%.

13. A chemical composition comprising one or more urethane oligomers of at least two polymerized units, wherein said oligomers comprise the reaction product of:
(a) an isocyanurate of hexamethylene 1,6-diisocyanate,
(b) 2,2-bis(hydroxymethyl)propionic acid,
(c) C$_4$F$_9$SO$_2$N(CH$_3$)CH$_2$CH$_2$OH,
(d) 3-aminopropyltriethoxysilane, and
(e) a combination of

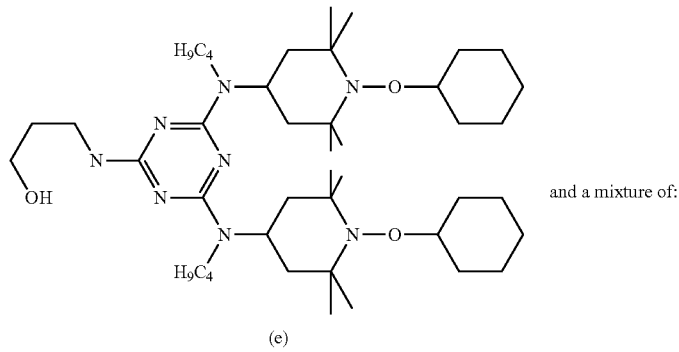

and a mixture of:

(e)

-continued

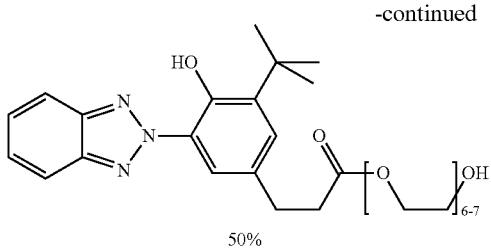

50%

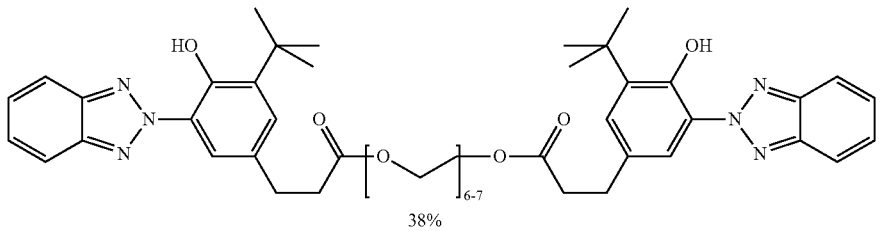

38% and H(OCH$_2$CH$_2$)$_{6-7}$OH, 12%.

14. A chemical composition comprising:
(a) an oligomer comprising at least two polymerized units, each said polymerized unit comprising a urethane group, and said oligomer being substituted with (i) one or more covalently bonded perfluoroalkyl groups, or one or more covalently bonded perfluoroheteroalkyl groups, and (ii) one or more covalently bonded silyl groups, and
(b) at least one stabilizer, said stabilizer being covalently bonded to said oligomer.

15. The chemical composition of claim 13 wherein said oligomer further comprises one or more covalently bonded water-solubilizing groups.

16. The chemical composition of claim 15 wherein said water-solubilizing groups are carboxylate groups.

17. The chemical composition of claim 15 wherein said oligomer is substituted with one or more covalently bonded perfluoroalkyl groups of 2 to 6 carbons.

18. The chemical composition of claim 17 wherein said oligomer further comprises one or more perfluoroheteroalkylene groups within the backbone of the polymerized unit.

19. A coating composition comprising the chemical composition of claim 13 and a diluent.

20. The coating composition of claim 19 wherein said diluent is selected from the group consisting of water, organic solvents, and mixtures thereof.

21. The coating composition of claim 19 further comprising a biocide.

22. The coating composition of claim 21 wherein said biocide is a mildicide.

23. The coating composition of claim 19 further comprising an acrylic polymer or a styrene acrylic copolymer resin.

24. An article wherein a portion of at least one surface of said article is coated with the coating composition of claim 19.

25. The article of claim 24 wherein said at least one surface is selected from the group consisting of concrete, glass, ceramic, masonry, natural stone, man-made stone, and wood.

26. The article of claim 24 wherein said at least one surface is porous.

27. A method for imparting stain-release characteristics to a substrate surface comprising the steps of:
(a) applying a coating composition of claim 20, and
(b) allowing said coating composition to cure.

28. The method of claim 27 wherein said substrate is a fibrous substrate.

29. The method of claim 27 wherein said substrate is selected from the group consisting of concrete, glass, ceramic, masonry, natural stone, man-made stone, and wood.

* * * * *